(12) United States Patent
Choi et al.

(10) Patent No.: US 10,379,399 B2
(45) Date of Patent: Aug. 13, 2019

(54) DISPLAY DEVICE AND BACKLIGHT UNIT INCLUDED THEREIN

(71) Applicant: SAMSUNG ELECTRONICS CO., LTD., Suwon-si, Gyeonggi-do (KR)

(72) Inventors: Sung Ho Choi, Suwon (KR); Yong-Hun Kwon, Anyang (KR); Tae-Hyeong Kim, Seoul (KR); Chun Soon Park, Suwon (KR); Young Chol Lee, Hwaseong (KR); Jong Cheol Lee, Yongin (KR); Jae Hak Cho, Hwaseong (KR); Seung Hun Chae, Suwon (KR); Hyung Jin Ha, Hwaseong (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 15/209,897

(22) Filed: Jul. 14, 2016

(65) Prior Publication Data

US 2017/0017120 A1 Jan. 19, 2017

Related U.S. Application Data

(60) Provisional application No. 62/192,213, filed on Jul. 14, 2015.

(30) Foreign Application Priority Data

Jul. 31, 2015 (KR) .......... 10-2015-0108513
Nov. 12, 2015 (KR) .......... 10-2015-0158837

(51) Int. Cl.
*G09F 13/04* (2006.01)
*G02F 1/1335* (2006.01)

(52) U.S. Cl.
CPC .. *G02F 1/133603* (2013.01); *G02F 1/133605* (2013.01); *G02F 1/133606* (2013.01);
(Continued)

(58) Field of Classification Search
CPC ......... G02F 1/133603; G02F 1/133621; G02F 1/133605; G02F 1/133606; G02F 2001/133624; G02F 2001/133614
See application file for complete search history.

(56) References Cited

U.S. PATENT DOCUMENTS

| | | | |
|---|---|---|---|
| 2005/0046321 A1* | 3/2005 | Suga | ............... G02B 5/0226 313/112 |
| 2008/0186428 A1* | 8/2008 | Sakamoto | ......... G02F 1/133617 349/62 |

(Continued)

FOREIGN PATENT DOCUMENTS

| | | |
|---|---|---|
| JP | 2005-183139 | 7/2005 |
| JP | 2007-25285 | 2/2007 |

(Continued)

OTHER PUBLICATIONS

Espacenet English translation of reference JP 2015168746 A.*

(Continued)

*Primary Examiner* — Diane I Lee
*Assistant Examiner* — Omar Rojas Cadima
(74) *Attorney, Agent, or Firm* — Staas & Halsey LLP

(57) ABSTRACT

A display device including a backlight unit; and an image forming unit configured to transmit or block light emitted from the backlight unit to create an image, wherein the backlight unit includes a light source, a reflector sheet configured to absorb light having a predetermined wavelength range among light emitted from the light source, and to reflect non-absorbed light, and an optical sheet configured to absorb light having the predetermined wavelength range among the light emitted from the light source, and to transmit non-absorbed light.

18 Claims, 23 Drawing Sheets

(52) U.S. Cl.
CPC .............. *G02F 1/133621* (2013.01); *G02F 2001/133614* (2013.01); *G02F 2001/133624* (2013.01)

(56) References Cited

U.S. PATENT DOCUMENTS

| | | | |
|---|---|---|---|
| 2010/0182532 A1* | 7/2010 | Lin | G02B 5/045 349/61 |
| 2015/0029439 A1 | 1/2015 | Kim et al. | |

FOREIGN PATENT DOCUMENTS

| | | |
|---|---|---|
| JP | 2009-25461 | 2/2009 |
| JP | 2009-104941 | 5/2009 |
| JP | 2009-251247 | 10/2009 |
| JP | 2009-251511 | 10/2009 |
| JP | 2010-122435 | 6/2010 |
| JP | 2010-250259 | 11/2010 |
| JP | 2014-199285 | 10/2014 |
| JP | 2015168746 A * | 9/2015 |
| KR | 10-2008-0073646 | 8/2008 |
| KR | 10-2010-0042310 | 4/2010 |

OTHER PUBLICATIONS

European Communication under Rule 71(3) EPC dated Mar. 16, 2018 in European Patent Application No. 16166932.0.
Korean Notice of Allowance dated Oct. 16, 2017 in corresponding Korean Patent Application No. 10-2015-0158837.
European Examination Report dated Jun. 30, 2017 in corresponding European Patent Application No. 16 166 932.0, 6 pages.
Korean Office Action dated Aug. 11, 2017 in corresponding Korean Patent Application No. 10-2015-0158837, 4 pages.
Republic of Korea Office Action dated Feb. 21, 2017 in corresponding Korean Patent Application No. 10-2015-0158837.
European Search Report dated Oct. 10, 2016 in corresponding European Patent Application No. 16 16 6932.
International Search Report dated Aug. 17, 2016 in corresponding International Application No. PCT/KR2016/004051.

* cited by examiner

DISPLAY DEVICE AND BACKLIGHT UNIT INCLUDED THEREIN

CROSS-REFERENCE TO RELATED APPLICATION

This application claims the benefit of U.S. Patent Application Ser. No. 62/192,213, filed on Jul. 14, 2015 in the U.S. Patent and Trademark Office, and Korean Patent Application No. 10-2015-0108513, filed on Jul. 31, 2015 and Korean Patent Application No. 10-2015-0158837, filed on Nov. 12, 2015 in the Korean Intellectual Property Office, the disclosures of which are incorporated herein by reference.

BACKGROUND

1. Field

Embodiments of the present disclosure relate to a display device and a backlight unit included therein, and more particularly, to a display device of displaying a wide color image, and a backlight unit included therein.

2. Description of the Related Art

A display device is a kind of output device that converts acquired or stored electrical information into visual information, and displays the visual information for a user. The display device is widely used in various fields including home appliances and industrial machines.

The display device includes a monitor connected to a Personal Computer (PC) or a server computer, a portable computer device, a navigation system, a general TeleVision (TV), an Internet Protocol TeleVision (IPTV), a portable terminal (for example, a smart phone, a tablet PC, a Personal Digital Assistant (PDA), or a cellular phone), various kinds of displays used to reproduce advertisement films or movie films in industrial sites, and various kinds of audio/video systems.

The display device can display still images or moving images using various kinds of display means. The display means includes Cathode Ray Tube (CRT), a Light-Emitting Diode (LED), an Organic Light-Emitting Diode (OLED), an Active-Matrix Light-Emitting Diode (AMLED), a liquid crystal, or electronic paper.

SUMMARY

Therefore, it is an aspect of the present disclosure to provide a display device capable of providing a wide color gamut.

It is another aspect of the present disclosure to provide a display device capable of providing a wide color gamut while minimizing the loss of brightness.

It is another aspect of the present disclosure to provide a backlight unit capable of removing yellow light or orange light included in light emitted from light sources.

Additional aspects of the disclosure will be set forth in part in the description which follows and, in part, will be obvious from the description, or may be learned by practice of the disclosure.

In accordance with one aspect of the present disclosure, a display device includes: a backlight unit; and an image forming unit configured to transmit or block light emitted from the backlight unit to create an image, wherein the backlight unit comprises a light source, a reflector sheet configured to absorb light having a predetermined wavelength range among light emitted from the light source, and to reflect non-absorbed light, and an optical sheet configured to absorb light having the predetermined wavelength range among the light emitted from the light source, and to transmit non-absorbed light.

The reflector sheet may include: a selective light absorption layer configured to absorb at least one of yellow light or orange light; and a reflector film configured to reflect incident light.

The selective light absorption layer may contain tetra-aza-porphyrin to absorb light having a wavelength range of about 570 nm to about 610 nm.

The reflector sheet may be formed by applying the tetra-aza-porphyrin on the reflector film.

The selective light absorption layer may contain a selective light absorption material to absorb light having a wavelength of about 585 nm maximally.

The optical sheet may include: a selective light absorption sheet configured to absorb at least one of yellow light or orange light; and a reflective polarizing sheet configured to transmit at least one part of incident light, and to reflect the remaining part of the incident light.

The selective light absorption sheet may contain tetra-aza-porphyrin to absorb light having a wavelength range of about 570 nm to 610 nm.

The selective light absorption sheet may be formed by applying the tetra-za-porphyrin on a transparent film.

The light source may include: a light-emitting diode configured to emit blue light; and a phosphor configured to absorb at least one part of the blue light, and to emit red light and green light.

The light source may include: a light-emitting diode configured to emit blue light; and a phosphor configured to absorb at least one part of the blue light, and to emit yellow light.

The backlight unit may further include an optical plate configured to diffuse the light emitted from the light source.

The light source may be disposed behind the optical plate, and the optical plate may diffuse the light emitted from the light source in the inside of the optical plate.

The light source may be disposed adjacent to a lateral side of the optical plate, and the optical plate may diffuse the light emitted from the light source in the inside of the optical plate.

The image forming unit may include a liquid crystal panel configured to transmit or block light according to an electrical field.

The liquid crystal panel may include: a liquid crystal layer including a plurality of liquid crystal molecules whose arrangement changes depending on the electric field; and a pair of transparent electrodes configured to form the electric field.

In accordance with another aspect of the present disclosure, a backlight unit includes: a light source configured to emit light; a reflector sheet configured to absorb at least one of yellow light or orange light among the light, and to reflect non-absorbed light; and an optical sheet configured to absorb at least one of the yellow light or the orange light among the light, and to transmit non-absorbed light.

The reflector sheet may include: a selective light absorption layer containing a selective light absorption material to absorb light having a wavelength range of about 570 nm to 610 nm; and a reflector film configured to reflect incident light.

The reflector sheet may be formed by applying tetra-aza-porphyrin on the reflector film.

The optical sheet may include: a selective light absorption sheet to absorb light having a wavelength range of about 570 nm to 610 nm; and a reflective polarizing sheet configured to transmit at least one part of incident light, and to reflect the remaining part of the incident light.

The selective light absorption sheet may be formed by applying tetra-aza-porphyrin on a transparent film.

The light source may include: a light-emitting diode configured to emit blue light; and a phosphor configured to absorb at least one part of the blue light, and to emit red light and green light.

The light source may include: a light-emitting diode configured to emit blue light; and a phosphor configured to absorb at least one part of the blue light, and to emit yellow light.

In accordance with one aspect of the present disclosure, a backlight for a liquid crystal display device includes a light source emitting light, a reflector sheet absorbing light having a predetermined wavelength range of the light from the light source, and reflecting non-absorbed light and an optical sheet absorbing light having the predetermined wavelength range of the light from the light source, and transmitting the non-absorbed light.

In accordance with one aspect of the present disclosure, a display device includes a backlight unit; and an image forming unit configured to one of transmit and block light emitted from the backlight unit to form an image, wherein the backlight unit comprises a light source, and a reflector sheet configured to absorb light having a predetermined wavelength range among light emitted from the light source, and to reflect non-absorbed light.

The reflector sheet comprises: a selective light absorption layer configured to absorb at least one of yellow light and orange light; and a reflector film configured to reflect incident light.

The selective light absorption layer contains tetra-aza-porphyrin to absorb light having a wavelength range of about 570 nm to about 610 nm.

The reflector sheet is formed by applying the tetra-aza-porphyrin to the reflector film.

The selective light absorption layer contains a selective light absorption material to absorb light having a wavelength maximum of about 585 nm.

In accordance with one aspect of the present disclosure, a display device includes a backlight unit; and an image forming unit configured to one of transmit and block light emitted from the backlight unit to form an image, wherein the backlight unit comprises: a light source; and an optical sheet configured to absorb light having the predetermined wavelength range among the light emitted from the light source, and to transmit the non-absorbed light.

The optical sheet comprises: a selective light absorption sheet configured to absorb at least one of yellow light and orange light; and a reflective polarizing sheet configured to transmit at least one part of incident light, and to reflect a remaining part of the incident light.

The selective light absorption sheet contains tetra-aza-porphyrin to absorb light having a wavelength range of about 570 nm to about 610 nm.

The selective light absorption sheet is formed by applying the tetra-aza-porphyrin to a transparent film.

The selective light absorption sheet contains a selective light absorption material to absorb light having a wavelength maximum of about 585 nm.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

In this specification, white light means mixed light resulting from mixing red light, green light, and blue light, or mixed light resulting from mixing blue light and yellow light. Also, natural light means mixed light resulting from mixing light of all wavelengths corresponding to a visible light area.

Figure 1:
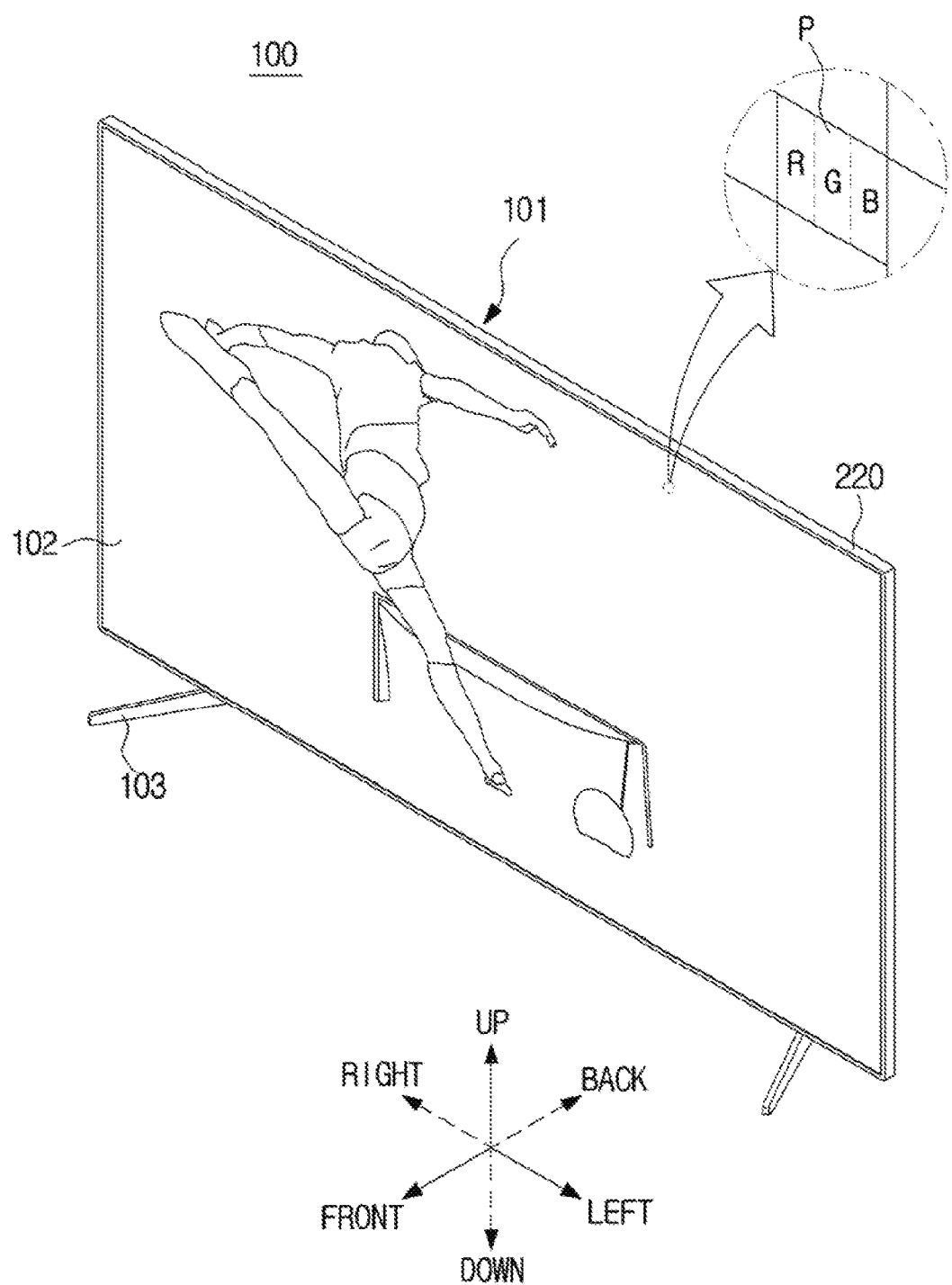
FIG. 1 shows an outer appearance of a display device according to an embodiment of the present disclosure.

FIG. 1 shows an outer appearance of a display device according to an embodiment of the present disclosure.

Referring to FIG. 1, a display device 100 is equipment for processing image signals received from the outside to visually display the processed signals as an image. In FIG. 1 an example in which the display device 100 is television (TV) is shown, however, the display device 100 is not limited to TV. For example, the display device 100 may be one of various kinds of displays, such as a monitor, a portable multimedia device, and a portable communication device, which are capable of visually displaying images.

As shown in FIG. 1, the display device 100 may include a main body 101, a screen 102 for displaying an image, and a supporter 103 connected to the lower part of the main body 101 to support the main body 101.

The main body 101 may form an outer appearance of the display device 100, and include components to enable the display device 100 to display images or to perform various functions. The main body 101 may be in the shape of a flat plate as shown in FIG. 1; however, the shape of the main body 101 is not limited to the flat plate. For example, the main body 101 may be in the shape of a curved plate whose left and right edges protrude forward and whose center part is recessed.

The screen 102 may be formed in the front side of the main body 101, and display images that are visual information. For example, the screen 102 may display a still image, a moving image, a 2Dimensional (2D) planar image, or a 3Dimensional (3D) stereoscopic image using a user's binocular disparity.

The screen 102 may include a plurality of pixels P, and the plurality of pixels P may emit light to form an image on the screen 102. Light emitted from the plurality of pixels P may be combined to form a still image, like mosaics, on the screen 102.

The individual pixels P may emit light of various brightness levels and various colors. In order to represent various colors, each pixel P may include a red pixel R, a green pixel G, and a blue pixel B.

The red pixel R may emit red light of various brightness levels, the green pixel G may emit green light of various brightness levels, and the blue pixel B may emit blue light of various brightness levels. The red light may be light corresponding to a wavelength range of about 620 nm (nano-meter, $\frac{1}{1,000,000,000}$m) to 750 nm, the green light may be light corresponding to a wavelength range of about 495 nm to 570 nm, and the blue light may be light corresponding to a wavelength range of about 450 nm to 495 nm.

Red light from the red pixel R, green light from the green pixel G, and blue light from the blue pixel B may be combined so that the pixel P can create light of various colors.

At this time, the variety of colors that can be created by the pixel P may be represented by a color reproduction ratio. More specifically, the variety of colors that can be created by the pixel P may be represented as a ratio of a color gamut that can be created by the pixel P with respect to a color gamut that can be created by sunlight.

More specifically, international standards for resolution, color gamut, and gamma related to displays were defined, and a representative international standard is Digital Cinema Initiatives (DCI). The color reproduction ratio may be a ratio of a color gamut that can be represented by a display with respect to a color gamut according to the DCI.

In order to improve the color reproduction ratio of the pixel P, the red, green, and blue pixels R, G, and B included in the pixel P may need to emit colors close to primary colors while having a wide brightness range.

As described above, the screen 102 shown in FIG. 1 may be in the shape of a flat plate; however, the shape of the screen 102 is not limited to the flat plate. For example, the screen 102 may be in the shape of a curved plate whose left and right edges protrude forward and whose center part is recessed, according to the shape of the main body 101.

Ideally, when the red pixel R emits light having a wavelength range of about 620 nm to 750 nm, the green pixel G emits light having a wavelength range of about 495 nm to 570 nm, and the blue pixel B emits light having a wavelength range of about 450 nm to 495 nm, the color reproduction ratio of the pixel P can be greatly improved. In other words, when the red, green, and blue pixels R, G, and B emit their own unique colors R, G, and B, the color reproduction ratio of the pixel P and the display device 100 can be improved.

The supporter 103 may connect to the lower part of the main body 101, and enable the main body 101 to be maintained at its stable position against a bottom surface. Also, selectively, the supporter 103 may connect to the back side of the main body 101, and enable the main body 101 to be firmly fixed on a wall.

The supporter 103 shown in FIG. 1 may be in the shape of a bar protruding forward from the lower part of the main body 101. However, the shape of the supporter 103 is not limited to the bar shape shown in FIG. 1, and may have any shape as long as it can support the main body 101 stably.

Figure 2:
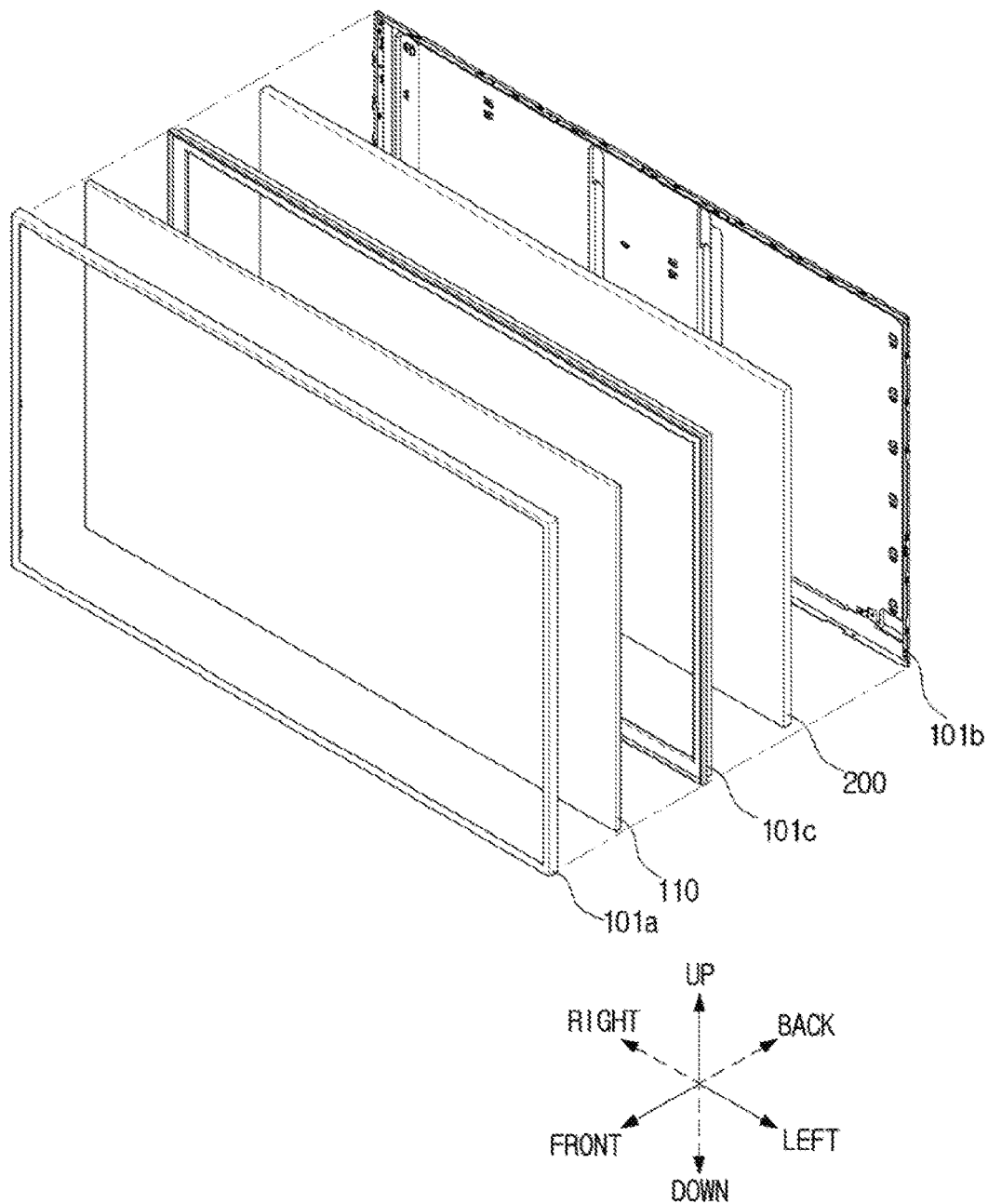
FIG. 2 is an exploded perspective view of a display device according to an embodiment of the present disclosure.

FIG. 2 is an exploded perspective view of the display device 100 according to an embodiment of the present disclosure.

As shown in FIG. 2, in the main body 101, various components to create an image on the screen 102 may be installed. More specifically, a backlight unit 200 to create surface light to emit it forward, and an image forming unit 110 to create an image using light emitted from the backlight unit 200 may be installed in the main body 101.

Also, a front chassis 101a, a rear chassis 101b, and a mold frame 101c to support and fix the image forming unit 110 and the backlight unit 200 may be installed in the main body 101.

The front chassis 101a may be in the shape of a plate having an opening so that images can be displayed through the opening.

The rear chassis 101b may be in the shape of a box whose front part opens, and accommodate the image forming unit 110 and the backlight unit 200 constituting the display device 100.

The mold frame 101c may be disposed between the front chassis 101a and the rear chassis 101b. More specifically, the mold frame 101c may be disposed between the image forming unit 110 and the backlight unit 200 to separate the image forming unit 110 from the backlight unit 200 and fix them.

The backlight unit 200 may include a plurality of point light sources to emit monochromatic light or white light, and may refract, reflect, and scatter light in order to convert light emitted from the point light sources into uniform surface light. As such, by refracting, reflecting, and scattering light, the backlight unit 200 can emit uniform surface light forward.

The configuration and operation of the backlight unit 200 will be described in detail, below.

The image forming unit 110 may be disposed in front of the backlight unit 200, and block or transmit light emitted from the backlight unit 200 in order to create an image.

The front surface of the image forming unit 110 may form the screen 102 of the display device 100, and be configured with a plurality of pixels P.

The plurality of pixels P included in the image forming unit 110 may block or transmit light emitted from the backlight unit 200 independently, and light transmitted by the plurality of pixels P may create an image that the display device 100 displays.

The image forming unit 110 may be a liquid crystal panel with optical properties that change according to an electric field.

Hereinafter, a liquid crystal panel will be described as an example of the image forming unit 110.

Figure 3:
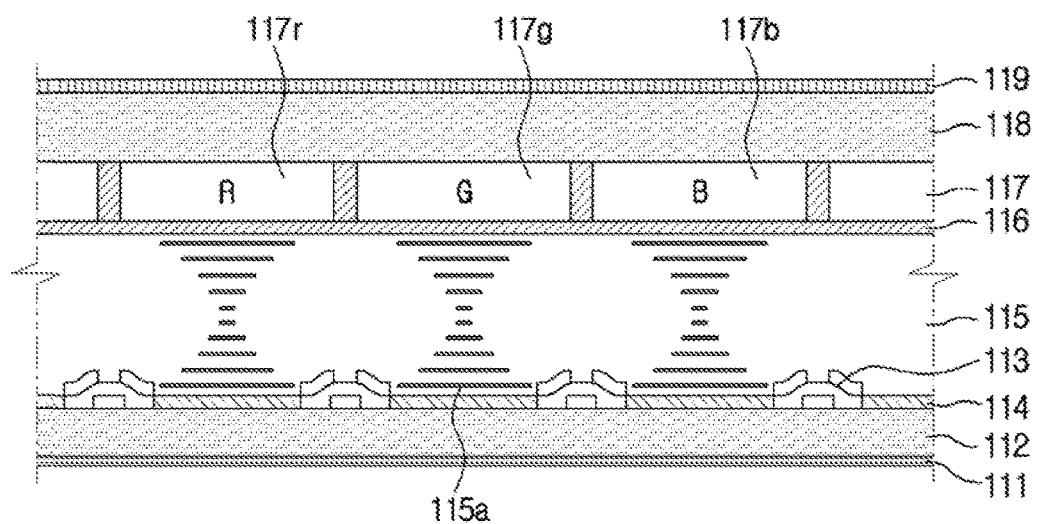
FIG. 3 is a cross-sectional view of a pixel included in an image forming unit of a display device according to an embodiment of the present disclosure.

FIG. 3 is a cross-sectional view of a pixel included in the image forming unit 110 of the display device 100 according to an embodiment of the present disclosure;

Referring to FIG. 3, the image forming unit 110 may include a first polarizing film 111, a first transparent substrate 112, a plurality of thin-film transistors 113, a plurality of pixel electrodes 114, a liquid crystal layer 115, a common electrode 116, a color film 117, a second transparent substrate 118, and a second polarizing film 119.

The first transparent substrate 112 and the second transparent substrate 118 may form an outer appearance of the image forming unit 110, and protect the liquid crystal layer 115 and the color film 117 provided between the first transparent substrate 112 and the second transparent substrate 118.

The first and second transparent substrates 112 and 118 may be made of tempered glass or a transparent film.

The first polarizing film 111 and the second polarizing film 119 may be respectively disposed on the outer surface of the first transparent substrate 112 and the outer surface of the second transparent substrate 118.

Light may be composed of a pair of an electric field and a magnetic field vibrating in a direction that is orthogonal to the traveling direction of the light. The electric field and the magnetic field may vibrate in all directions that are orthogonal to the traveling direction of the light.

A phenomenon in which an electric field or a magnetic field vibrates in a specific direction is called polarization. Also, a film to transmit light including an electric field or a magnetic field vibrating in a predetermined direction and block light including an electric field or a magnetic field vibrating in the other directions among light including electric fields and magnetic fields vibrating in arbitrary directions is called a polarizing film.

In other words, a polarizing film may transmit light vibrating in a predetermined polarizing direction, and block light vibrating in the other directions.

The first polarizing film 111 may transmit light vibrating in a first polarizing direction, and block light vibrating in the other directions. Also, the second polarizing film 119 may transmit light vibrating in a second polarizing direction, and block light vibrating in the other directions.

Also, the first polarizing direction may be orthogonal to the second polarizing direction. In other words, the vibration direction of light transmitted through the first polarizing film 111 may be orthogonal to the vibration direction of light transmitted through the second polarizing film 119. As a result, light cannot be transmitted through both the first polarizing film 111 and the second polarizing film 119 at the same time.

The color film 117 may be formed on the inner surface of the second transparent substrate 118.

The color film 117 may include a red film 117r to transmit red light, a green film 117g to transmit green light, and a blue film 117b to transmit blue light, wherein the red film 117r, the green film 117g, and the blue film 117b may be arranged side by side.

The color film 117 may be formed to correspond to each pixel P. More specifically, the red film 117r may be formed to correspond to the red pixel R, the green film 117g may be formed to correspond to the green pixel G, and the blue film 117b may be formed to correspond to the blue pixel B.

In other words, the red pixel R, the green pixel G, and the blue pixel B may be formed by the red film 117r, the green film 117g, and the blue film 117b, and the red film 117r, the green film 117g, and the blue film 117b may be combined to form the pixel P.

The thin-film transistors 113 may be formed on the inner surface of the first transparent substrate 112.

More specifically, the thin film transistors 113 may be respectively formed to correspond to areas between the red film 117a and the green film 117g and between the green film 117g and the blue film 117b.

The thin-film transistors 113 may interrupt current flowing through the pixel electrodes 114 which will be described later. More specifically, an electric field may be formed or removed between the pixel electrodes 114 and the common electrode 116, according to turning-on (activation or closing) or turning-off (deactivation or opening) of the thin-film transistors 113.

The thin-film transistors 113 may be made of poly-silicon, and may be fabricated using a semiconductor process, such as lithography, deposition, or ion implantation.

The pixel electrodes 114 may be formed between the thin-film transistors 113 on the first transparent substrate 112, and the common electrode 116 may be formed on the inner surface of the color film 117.

The pixel electrodes 114 and the common electrode 116 may be made of a metal material having electrical conductivity, and may form an electric field to change alignment of liquid crystal molecules 115a constituting the liquid crystal layer 115 which will be described later.

The pixel electrodes 114 may be respectively formed at areas corresponding to the red film 117r, the green film 117g, and the blue film 117b, and the common electrode 116 may be formed throughout the panel. As a result, an electric field may be selectively formed at the areas corresponding to the red film 117r, the green film 117g, and the blue film 117b in the liquid crystal layer 115.

Also, the pixel electrodes 114 and the common electrode 116 may be made of a transparent material to transmit light incident from the outside.

The pixel electrodes 114 and the common electrode 116 may be formed with Indium Tin Oxide (ITO), Indium Zinc Oxide (IZO), Ag nano wire, carbon nano tube (CNT), graphene, or 3,4-ethylenedioxythiophene (PEDOT).

The liquid crystal layer 115 may be formed between the pixel electrodes 114 and the common electrode 116, and may be filled with the liquid crystal molecules 115a.

Liquid crystal means an intermediate state between a solid (crystal) state and a liquid state. When a material in a solid state is heated, the material changes from the solid state to a transparent liquid state at its melting temperature. However, when a liquid crystal material in a solid state is heated, the liquid crystal material changes to an opaque, turbid liquid at its melting temperature, and then changes to a transparent liquid state. The term "liquid crystal" represents a liquid crystal state which is an intermediate state between a solid state and a liquid state, or represents a material in a liquid crystal state.

Most of liquid crystal materials are organic compounds. A molecule of a liquid crystal material is in the shape of a thin rod. Also, the molecular arrangement of the liquid crystal material is irregular when seen in a specific direction, but appears as a regular crystalloid pattern when seen in another direction. Accordingly, the liquid crystal has both the fluidity of a liquid and the optical anisotropy of a solid.

Also, the liquid crystal shows optical properties according to a change of an electric field. For example, the liquid crystal may change the orientation of the molecular arrangement according to a change of an electric field.

For example, if an electric field is formed in the liquid crystal layer 115, the liquid crystal molecules 115a of the liquid crystal layer 115 may be arranged in the direction of the electric field, and if no electric field is formed in the liquid crystal layer 115, the liquid crystal molecules 115a may be arranged according to the orientation layer (not shown) of the liquid crystal layer 115.

As a result, the image forming unit (that is, a liquid crystal panel) 110 may change its optical properties according to existence/absence of an electric field in the liquid crystal layer 115.

For example, when an electric field is formed in the liquid crystal layer 115, light polarized by the first polarizing film 111 cannot pass through the second polarizing film 119 due to the arrangement of the liquid crystal molecules 115a in the liquid crystal layer 115. In other words, at a pixel P corresponding to an area of the liquid crystal layer 115 in which an electric field is formed, light is blocked by the image forming unit 110.

Meanwhile, when no electric field is formed in the liquid crystal layer 115, light polarized by the first polarizing film 111 can pass through the second polarizing film 119 due to the arrangement of the liquid crystal molecules 115a in the liquid crystal layer 115. In other words, at a pixel P corresponding to an area of the liquid crystal layer 115 in which no electric field is formed, light is transmitted by the image forming unit 110.

As described above, the image forming unit 110 may control a light transmission ratio for each pixel P (more specifically, for each of a red pixel, a green pixel, and a blue pixel included in each pixel P). As a result, light emitted from the plurality of pixels P may be combined to display an image on the screen 102 of the display device 100.

Hereinafter, the backlight unit 200 will be described.

The backlight unit 200 can be classified into a direct-type backlight unit and an edge-type backlight unit according to the position of a light source.

First, the direct-type backlight unit will be described below.

Figure 4:
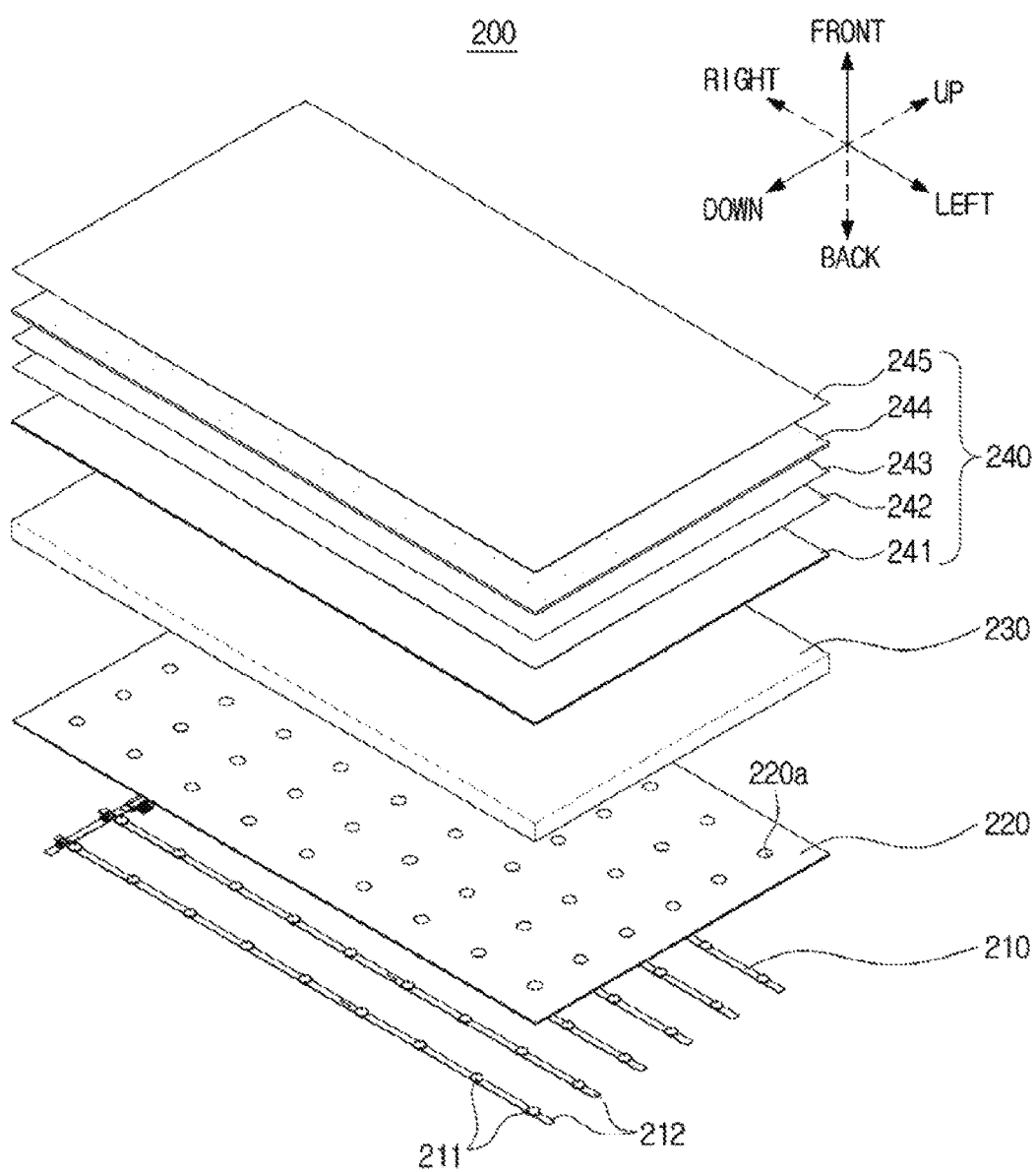
FIG. 4 is an exploded perspective view of a backlight unit according to an embodiment of the present disclosure.
Figure 5A:
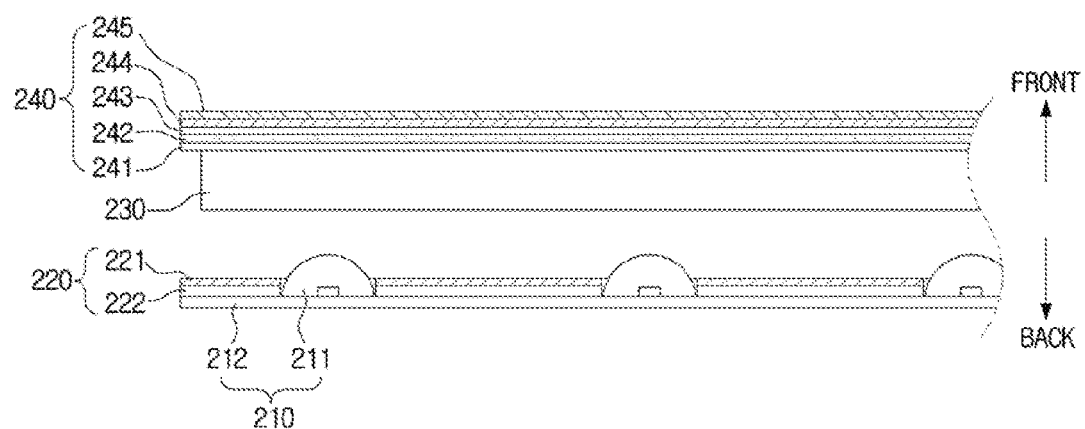
FIGS. 5A and 5B are cross-sectional views of a backlight unit according to an embodiment of the present disclosure.
Figure 5B:
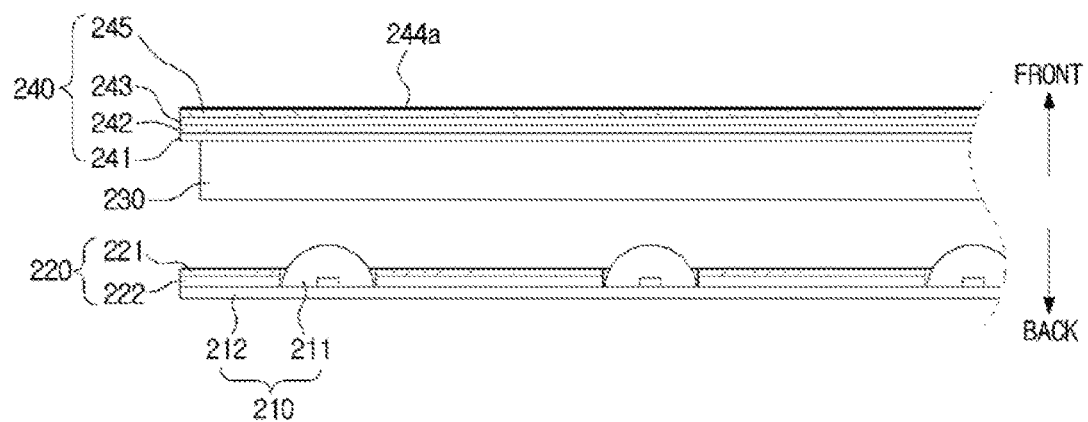
Figure 6:
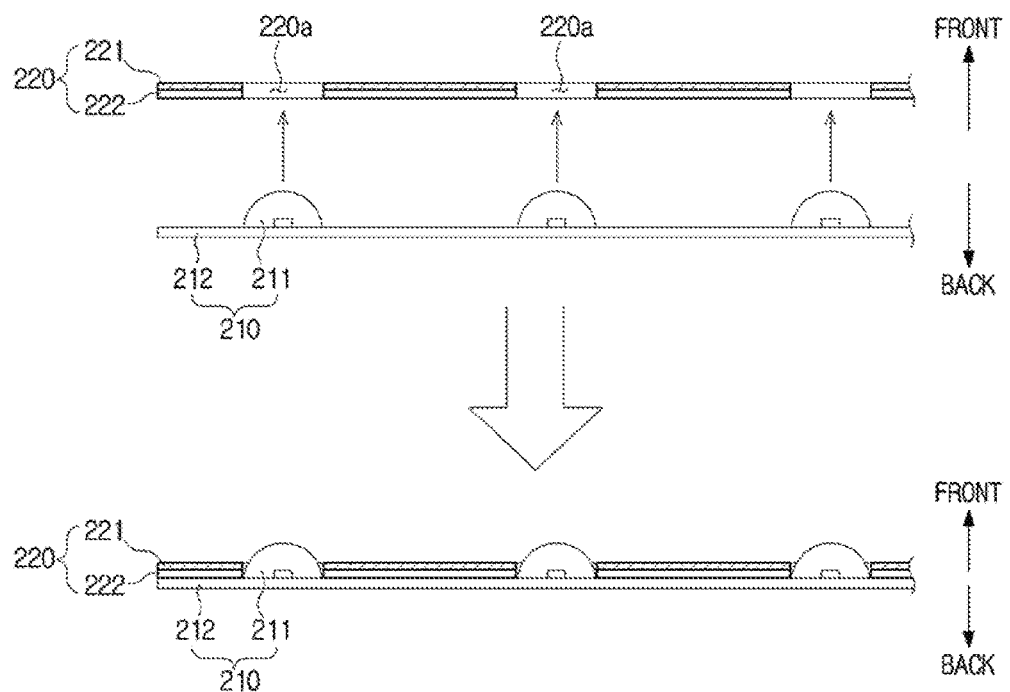
FIG. 6 is a view for describing coupling of light sources with a reflector sheet included in a backlight unit according to an embodiment of the present disclosure.
Figure 7:
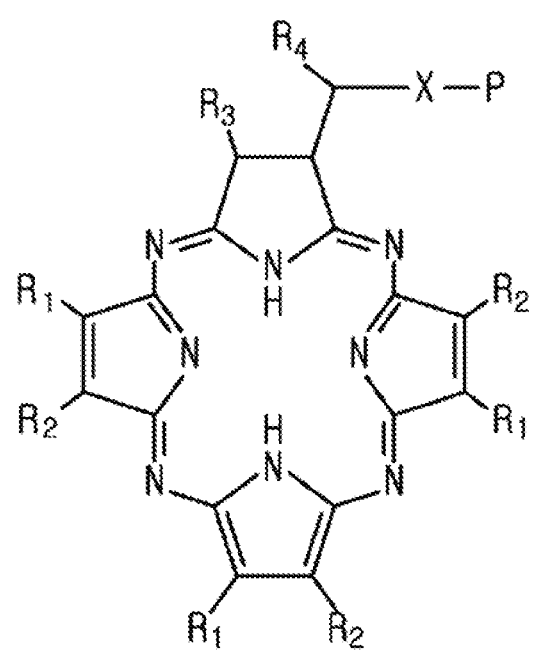
FIG. 7 shows a molecular structure of a light absorption material included in a backlight unit according to an embodiment of the present disclosure.

FIG. 4 is an exploded perspective view of a backlight unit according to an embodiment of the present disclosure, FIGS. 5A and 5B are cross-sectional views of a backlight unit according to an embodiment of the present disclosure, FIG. 6 is a view for describing coupling of light sources with a reflector sheet included in a backlight unit according to an embodiment of the present disclosure, and FIG. 7 shows a molecular structure of a light absorption material included in a backlight unit according to an embodiment of the present disclosure.

Referring to FIGS. 4, 5A and 5B, a direct-type backlight unit 200 may include a light-emitting module 210 to generate light, a reflector sheet 220 to reflect light, a diffuser plate 230 to diffuse light, and an optical sheet 240 to improve the brightness of light.

The light-emitting module 210 may include a plurality of light sources 211 to emit light, and a supporter 212 to support and fix the plurality of light sources 211.

The plurality of light sources 211 may be arranged uniformly in the rearmost part of the backlight unit 200, as shown in FIG. 4, to emit light forward.

Also, the plurality of light sources 211 may be arranged in a predetermined pattern such that light emitted from the plurality of light sources 211 has uniform brightness as possible. More specifically, the plurality of light sources 211 may be arranged such that distances between neighboring light sources are the same.

For example, as shown in FIG. 4, the plurality of light sources 211 may be arranged in a matrix pattern such that four neighboring light sources form a square. As a result, each light source may be positioned adjacent to four light sources, and distances between the light source and its neighboring light sources may be the same.

As another example, the plurality of light sources 211 may be arranged in a plurality of rows, and a light source belonging to each row may be positioned to correspond to the mid-point between two neighboring light sources belonging to the adjacent row. As a result, the plurality of light sources 211 may be arranged such that three neighboring light sources form a regular triangle. Also, each light source may be positioned adjacent to six light sources such that distances between the light source and its adjacent six light sources are the same.

However, a pattern in which the plurality of light sources 211 are arranged is not limited to the above-described patterns. That is, the plurality of light sources 211 may be arranged in any other pattern as long as light emitted from the plurality of light sources 211 has uniform brightness.

The light sources 211 may be implemented as devices that can emit monochromatic light (light of a specific wavelength, for example, blue light) or white light (mixed light resulting from mixing light of various wavelengths) in all directions when power is supplied.

For example, the light sources 211 may be Light Emitting Diodes (LEDs) or Cold Cathode Fluorescence Lamps (CCFLs) having low heat generation.

In the case in which the light sources 211 emits white light, each light source 211 may include a blue light-emitting diode to emit blue light which is high energy light, and a Red/Green (RG) phosphor to absorb blue light to emit green light and red light. White light may be defined as mixed light resulting from mixing red light, green light, and blue light, or mixed light resulting from mixing blue light and yellow light.

Also, each light source 211 may include a blue light-emitting diode to emit blue light which is high energy light, and a Yellow (YAG) phosphor to absorb blue light to emit yellow light. Also, the light source 211 may include a blue light-emitting diode and a $K_2SiF_6$ (KSF) or $K_2TiF_6$ (KTF) phosphor developed recently.

Also, each light source 211 may include a red light-emitting diode to emit red light, a green-emitting diode to emit green light, a blue light-emitting diode to emit blue light, and a light mixer to mix monochromatic light.

The supporter 212 may fix the plurality of light sources 211 so that the positions of the light sources 211 do not change. Also, the supporter 212 may supply power to the individual light sources 211 so that the light sources 211 can emit light.

Also, there may be provided a plurality of supporters 212 according to the arrangement of the plurality of light sources 211. For example, when the plurality of light sources 211 are arranged in rows, as shown in FIG. 4, the same number of supporters 212 as the number of the rows of the plurality of light sources 211 may be provided, and each supporter 212 may fix light sources 211 belonging to the row corresponding to the supporter 212.

The supporters 212 may be fabricated with a synthetic resin which fixes the plurality of light sources 211 and on which conductive power supply lines for supplying power to the light sources 211 are formed. Alternatively, the supporters 212 may be fabricated with a Printed Circuit Board (PCB).

The reflector sheet 220 may include a selective light absorption layer 221 to absorb light having a specific wavelength range among incident light, and a reflective film 222 to reflect light traveling backward to send the light in a forward or near-forward direction.

The reflector sheet 220 may include a plurality of through holes 220a at locations corresponding to the light sources 211 of the light-emitting module 210. Also, the light sources 211 of the light-emitting module 210 may pass through the through holes 220a and protrude from the reflector sheet 220, as shown in FIG. 5.

More specifically, when the reflector sheet 220 is assembled with the light-emitting module 210, the light sources 211 of the light-emitting module 210 may be inserted into the through holes 220a formed in the reflector sheet 220, as shown in the upper part of FIG. 6. As a result, the supporters 212 of the light-emitting module 210 may be located below the reflector sheet 220, and the light sources 211 of the light-emitting module 210 may be located above the reflector sheet 220, as shown in the lower part of FIG. 6.

Accordingly, the light sources 211 can emit light forward from the reflector sheet 220.

Since the light sources 211 emit light forward from the reflector sheet 220 in all directions, a part of light emitted from the light sources 211 may travel backward. The reflective film 211 of the reflector sheet 220 may reflect light traveling backward from the light sources 211 to send the light in the forward direction.

Also, light emitted from the light sources 211 may pass through various components including the diffuser plate 230 and the optical sheet 240. When light passes through the diffuser plate 230 and the optical sheet 240, a part of the light may be reflected from the surfaces of the diffuser plate 230 and the optical sheet 240, without being transmitted through the diffuser plate 230 and the optical sheet 240. The light reflected from the diffuser plate 230 and the optical sheet 240 may travel backward. The reflective film 222 of the reflector sheet 220 may again reflect the light reflected from the diffuser plate 230 and the optical sheet 240 to send the light in the forward direction.

The reflective film 222 may reflect light traveling toward the rear part of the backlight unit 200 to send the light in the forward direction.

The reflective film 222 may be formed by coating a base material with a material having high reflectivity. For example, the reflective film 222 may be formed by coating a base material such as polyethylene terephthalate (PET) with polymer having high reflectivity.

For example, the selective light absorption layer 221 may be formed by applying a selective light absorption material for selectively absorbing light having a predetermined wavelength range on the reflective film 222. As another example, the selective light absorption layer 221 may be formed by providing a sheet containing a selective light absorption material on the reflective film 222.

The selective light absorption material can selectively absorb light having a predetermined wavelength range.

As described above, in order to improve a color gamut that can be represented by the display device 100, the individual pixels R, G, and B need to emit colors close to primary colors (red, green, and blue colors).

In order for the individual color pixels R, G, and B to emit colors close to primary colors (red, green, and blue colors), the red film 117r, the green film 117g, and the blue film 117b included in the color film 117 need to transmit light of only red, green, and blue colors, respectively, or the light sources 211 need to emit light of only red, green, and blue colors.

However, generally, the color film 117 may transmit light of wavelengths adjacent to those of light of red, green, and blue colors, as well as the light of red, green, and blue colors. For example, the red film 117r may transmit a part of orange light having a wavelength adjacent to that of red light, as well as the red light. Also, the green film 117g may transmit yellow light having a wavelength adjacent to that of green light, as well as the green light, and the blue film 117b may transmit purple light having a wavelength adjacent to that of blue light, as well as the blue light.

Also, the light sources 211 may emit light having wavelengths adjacent to those of light of red, green, and blue colors, as well as the light of red, green, and blue colors. For example, if a light source 211 includes a blue-light emitting diode and a R/G phosphor, the light source 211 may emit yellow light, in addition to red light, green light, and blue light, through the R/G phosphor. Also, if a light source 211 includes a blue-light emitting diode and a yellow phosphor, the light source 211 may emit blue light and yellow light.

As such, since the light sources 211 emit light having wavelengths adjacent to those of red light, green light, and blue light, in addition to the red light, green light, and blue light, and the color film 117 transmits the light having the wavelengths adjacent to those of the red light, green light, and blue light, in addition to the red light, green light, and blue light, a color gamut that can be represented by the display device 100 is limited.

In order to overcome the limitation of the color film 117 and the light sources 211, a selective light absorption material may be used.

More specifically, the selective light absorption material may absorb light (that is, yellow light) having a wavelength between the wavelength of red light and the wavelength of green light, or may absorb light having a wavelength between the wavelength of green light and the wavelength of blue light, so that the individual color pixels R, G, and B can emit light of colors close to primary colors (red color, green color, and blue color).

Particularly, if the light source 211 includes a blue-light emitting diode and a R/G phosphor, the selective light absorption material may selectively absorb yellow light having a wavelength between the wavelength of red light and the wavelength of green light so as to selectively absorb yellow light emitted from the light source 211. As a result, the backlight unit 200 can emit white light which red color, green color, and blue color are mixed to form, thereby widening a color gamut that can be represented by the display device 100.

For example, the selective light absorption material may absorb light of a wavelength of about 585 nm maximally, and absorb more light having a wavelength range of about 570 nm to 610 nm than light of the other wavelengths. In other words, the selective light absorption material may absorb light having a wavelength range corresponding to yellow and orange colors.

The selective light absorption material may be prepared by mixing an organic material capable of selectively absorbing light having a wavelength range of yellow and orange colors with a transparent organic solvent.

An example of the organic material used for preparing the selective light absorption material is tetra-aza-porphyrin (TAP) widely known as Porphyrazine.

Tetra-aza-porphyrin is tetrapyrrole macrocycle similar to Porphyrin, phthalocyanine, etc. More specifically, tetra-aza-porphyrin has a cyclic structure including eight nitrogen atoms, four pairs of bases (R1, R2), and a plurality of carbon atoms (C) and hydrogen atoms (H).

Also, tetra-aza-porphyrin is well known as a material absorbing ultraviolet light, red light, and near-infrared light. More specifically, tetra-aza-porphyrin can absorb light having a wavelength range of 300 nm to 400 nm, and light having a wavelength of 600 nm or more.

If any one base of the four pairs of bases (R1 and R2) is replaced with a metal atom X and phosphorous (P), the optical properties of the tetra-aza-porphyrin may change. More specifically, the tetra-aza-porphyrin can absorb more light having a wavelength range of 570 nm to 610 nm than light of the other wavelengths.

For example, when any one of copper (Cu), chrome (Cr), vanadium (V), and molybdenum (Mo) is used as the metal atom X, the tetra-aza-porphyrin may absorb significantly more light having a wavelength range of 570 nm to 610 nm than light of the other wavelengths. The tetra-aza-porphyrin may absorb light of a specific wavelength using an additional functional group other than a metal atom X.

Since the light having the wavelength range of 570 nm to 610 nm is light of yellow and orange colors, the tetra-aza-porphyrin can further absorb light of yellow and orange colors when at least one of Cu, Cr, V, and Mo is used as the metal atom X.

Also, the tetra-aza-porphyrin may scarcely or partially absorb light of the other wavelengths. Accordingly, light of a wavelength not belonging to the wavelength range of 570 nm to 610 nm may be transmitted through the tetra-aza-porphyrin without being absorbed in the tetra-aza-porphyrin.

As such, the selective light absorption material including tetra-aza-porphyrin can selectively absorb yellow or orange light.

The reflector sheet 220 may reflect light traveling toward the back part of the backlight unit 200 to send the light in the forward direction, and may absorb a part of yellow or orange light included in incident light.

The diffuser plate 230 may be provided above the light-emitting module 210 and the reflector sheet 220, and uniformly diffuse light emitted from the light sources 211 of the light-emitting module 210.

As described above, the light sources 211 may be positioned at regular intervals in the back part of the backlight unit 200. Although the light sources 211 are equally arranged or spaced in the back part of the backlight unit 200, a non-uniform brightness distribution may occur according to the positions of the light sources 211.

The diffuser plate 230 may diffuse light emitted from the light sources 211 in order to remove non-uniform brightness distribution due to the light sources 211. In other words, the diffuser plate 230 may receive non-uniform light from the light sources 211, and emit uniform light forward. Particularly, the diffuser plate 230 may have a milky-white color so that the uniformity of brightness is not lost when light emitted from the light sources 211 directly passes through the diffuser plate 230, wherein a light transmission ratio of the diffuser plate 230 may be about 50 to 70%.

The diffuser plate 230 may be configured with a core to transmit and diffuse light, and a pair of skins to protect the core and diffuse light. The core may be made of poly methyl methacrylate (PMMA) or polycarbonate (PC) containing a diffusing agent for light diffusion. The skins may be made of PMMA or PC containing a sunscreen composition for protecting the core.

The optical sheet 240 may include, as shown in FIG. 5A, various sheets for improving brightness and the uniformity of brightness. More specifically, the optical sheet 240 may include a diffuser sheet 241, a first prism sheet 242, a second prism sheet 243, a selective light absorption sheet 244, and a reflective polarizing sheet 245.

The diffuser sheet 241 may diffuse light in order to improve the uniformity of brightness. Light emitted from the light sources 211 may be diffused by the diffuser plate 230, and then again diffused by the diffuser sheet 241 included in the optical sheet 240.

The diffuser plate 230 and the diffuser sheet 241 may be used to remove non-uniform brightness distribution due to point light sources so that light having uniform brightness and uniform colors can be emitted through the entire screen 102 of the display device 100.

Light passing through the diffuser sheet 241 may be diffused in a direction that is orthogonal to the surface of the diffuser sheet 241, thereby sharply reducing brightness.

The first and second prism sheets 242 and 243 may focus the light diffused by the diffuser sheet 241 to thereby increase brightness.

The first and second prism sheets 242 and 243 may include a plurality of prism patterns each having a trigonal prism shape, wherein the plurality of the prism patterns are arranged adjacent to each other to form a plurality of bands.

A direction in which the prism patterns of the first prism sheet 242 are arranged may be orthogonal to a direction in which the prism patterns of the second prism sheet 243 are arranged. For example, if the first prism sheet 242 is arranged in a left-right direction, the second prism sheet 243 may be arranged in an up-down direction.

Light passed through the first and second prism sheets 242 and 243 may have a viewing angle of about 70 degrees while having improved brightness, and travel toward the front part of the backlight unit 200.

The selective light absorption sheet 244 may selectively absorb light having a specific wavelength range, like the selective light absorption layer 221 of the reflector sheet 220. However, the reflector sheet 220 may selectively absorb light of a specific wavelength while reflecting light of the other wavelengths, whereas the selective light absorption sheet 244 may selectively absorb light of a specific wavelength while transmitting light of the other wavelengths.

The selective light absorption sheet 244 may be formed by coating a base material with a selective light absorption material. For example, the selective light absorption sheet 244 may be formed by coating a base material such as PET with tetra-aza-porphyrin. The tetra-aza-porphyrin is a material obtained by replacing any one of four pairs of bases (R1, R2) of tetra-aza-porphyrin with a metal atom X and phosphorous P.

The selective light absorption sheet 244 may selectively absorb light having a wavelength range corresponding to yellow and orange colors, and transmit light having the other wavelength ranges.

By selectively absorbing light having a wavelength range corresponding to yellow and orange colors through both the selective light absorption layer 221 of the reflector sheet 220 and the selective light absorption sheet 244 of the optical sheet 240, a color gamut that can be represented by the display device 100 may be further widened.

Effects of the selective light absorption layer 221 of the reflector sheet 220 and the selective light absorption sheet 244 of the optical sheet 240 will be described in more detail, later.

The reflective polarizing sheet 245, which is a kind of a polarizing film, may transmit a part of incident light, and reflect the remaining light in order to enhance brightness. For example, the reflective polarizing sheet 245 may transmit light polarized in the same direction as a predetermined polarization direction, and reflect light polarized in directions that are different from the predetermined polarization direction.

The polarization direction of the reflective polarizing sheet 245 may be the same as the polarization direction of the first polarizing film 111 included in the image forming unit 110 described above. As a result, light transmitted through the reflective polarizing sheet 245 may also be transmitted through the first polarizing film 111 included in the image forming unit 110.

Also, light reflected from the reflective polarizing sheet 245 may be recycled in the inside of the backlight unit 200, and due to the recycling of light, the brightness of the display device 100 may be improved.

The recycling of light will be described in detail, together with the effects of the selective light absorption layer 221 of the reflector sheet 220 and the selective light absorption sheet 244 of the optical sheet 240, below.

However, the optical sheet 240 is not limited to the sheets or films shown in FIGS. 5A-5B, and the optical sheet 240 may further include various sheets or films such as a protection sheet.

Also, the order in which the diffuser sheet 241, the first prism sheet 242, the second prism sheet 243, the selective light absorption sheet 244, and the reflective polarizing sheet 245 are stacked is not limited to that as shown in FIG. 5A.

For example, in FIG. 5A, the selective light absorption sheet 244 is disposed between the reflective polarizing sheet 245 and the prism sheets 242 and 243; however, the selective light absorption sheet 244 may be disposed on the front surface of the reflective polarizing sheet 245, between the prism sheets 242 and 243 and the diffuser sheet 241, or below the diffuser sheet 241. In other words, the position of the selective light absorption sheet 244 is not limited to that as shown in FIG. 5A.

Also, the optical sheet 240 may omit at least one part of the sheets or films shown in FIG. 5A.

For example, the optical sheet 240 may include, as shown in FIG. 5B, the diffuser sheet 241, the first prism sheet 242, the second prism sheet 243, and the reflective polarizing sheet 245.

In this case, a selective light absorption material 244a may be applied on the front surface of the reflective polarizing sheet 245. For example, tetra-aza-porphyrin (TAP) may be applied on the front surface of the reflective polarizing sheet 245.

As a result, the reflective polarizing sheet 245 can reflect light selectively according to a polarization direction, and also absorb light selectively according to a wavelength.

For example, the reflective polarizing sheet 245 may transmit light polarized in the same direction as a predetermined polarization direction, and reflect light polarized in directions that are different from the predetermined polarization direction. Also, the reflective polarizing sheet 245 may selectively absorb light of a predetermined wavelength range (for example, light of 570 nm to 610 nm), and transmit light not belonging to the predetermined wavelength range.

However, the selective light absorption material 244a may be not limited to be applied on the front surface of the reflective polarizing sheet 245.

For example, the selective light absorption material 244a may be applied on the rear surface of the reflective polarizing sheet 245, on the front or rear surface of the second prism sheet 243, on the front or rear surface of the first prism sheet 242, or on the front or rear surface of the diffuser sheet 241.

As described above, the display device 100 may include the image forming unit 110 and the backlight unit 200. Also, the backlight unit 200 may include the selective light absorption layer 221 of the reflector sheet 220 and the selective light absorption sheet 244 of the optical sheet 240 in order to widen a color gamut that can be represented by the display device 100. Also, the backlight unit 200 may include the optical sheet 240 on which the selective light absorption material 244a is applied.

Hereinafter, recycling of light and selective absorption of light that are generated in the backlight unit 200 will be described.

First, recycling of light and selective absorption of light by the selective light absorption sheet 244 of the optical sheet 240 will be described below.

Figure 8:
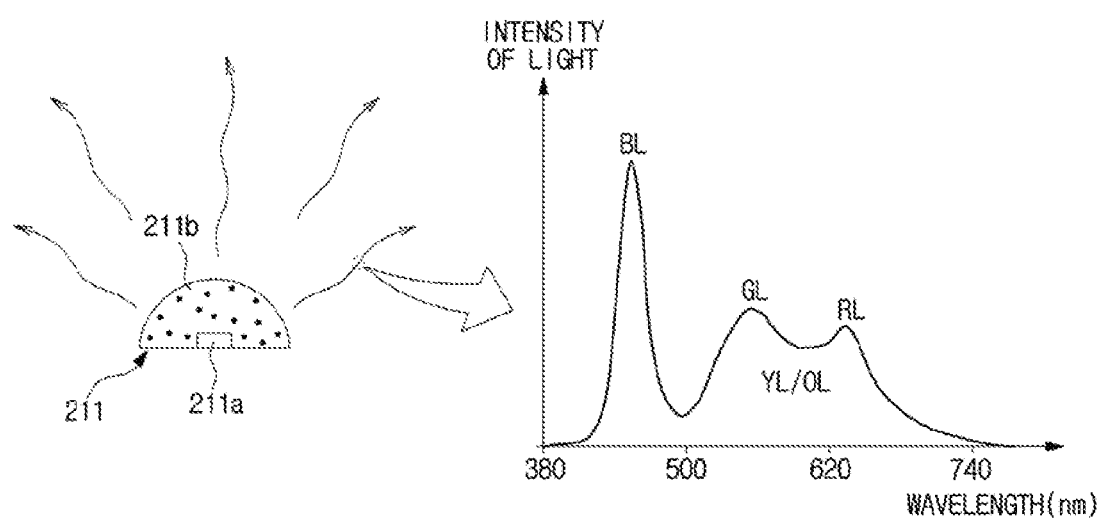
FIG. 8 shows a configuration of a light source included in a backlight unit according to an embodiment of the present disclosure, and a spectrum of light emitted from the light source.

FIG. 8 shows a configuration of a light source 211 included in the backlight unit 200 according to an embodiment of the present disclosure, and a spectrum of light emitted from the light source 211.

As described above, the light-emitting module 210 may include the plurality of light sources 211 to emit light, and the supporter 212 to support and fix the plurality of light sources 211.

Each light source 211 may include a blue light-emitting diode 211a to emit blue light, and a RG phosphor 211b to absorb blue light to emit red light and green light or yellow light, as shown in the left part of FIG. 8.

The blue light-emitting diode 211a may be formed with an indium-gallium-nitrogen compound (InGaN) obtained by adding indium to a gallium-nitrogen compound (GaN).

The gallium-nitrogen compound (GaN) may have an energy band gap of about 3.4 eV, and emit near-ultraviolet light having a wavelength of 365 nm. Also, the indium-nitrogen compound (InN) may have an energy band gap of about 0.8 eV, and emit infrared light.

If indium (In) is added to the gallium-nitrogen compound (GaN), the energy band gap may change from about 3.4 eV to 0.8 eV according to the rate of addition of indium (In). By adjusting the portion of indium (In) that is added to the gallium-nitrogen compound (GaN), the indium-gallium-nitrogen compound (InGaN) may emit blue light having a wavelength of about 450 nm.

By injecting impurities into the indium-gallium-nitrogen compound (InGaN), the p-n junction of the Indium-Gallium- Nitrogen compound (InGaN) may be made, and the p-n junction may emit blue light having a wavelength of about 450 nm.

The phosphor 211b may be an inorganic luminescence material to absorb light or heat from the outside and to change the absorbed energy to visible light to emit visible light.

More specifically, the phosphor 211b may be prepared by adding active ions directly involved in light-emitting to a base material, such as garnets, silicates, sulfides, oxy-nitrides, and nitrides. As the active ions, europium (Eu) ions or cerium (Ce) ions are widely used.

For example, when Eu ions are added to a sulfide or nitride, the phosphor 211b may emit red light and green light. Such a phosphor emitting red light and green light is called an R/G phosphor. However, the R/G phosphor does not emit only red light and green light, but also emit yellow light or orange light having a wavelength between the wavelength of red light and the wavelength of green light.

Also, when Ce ions are added to a garnet (Y3Al5O12: YAG or Tb3Al5O12:TAG), the phosphor 211b can emit yellow light. Such a phosphor of emitting yellow light is called a yellow phosphor.

The phosphor 211b may absorb a part of blue light emitted from the blue light-emitting diode 211a, and transmit the remaining part of the blue light. Also, the phosphor 211b may change the absorbed blue light into red light or green light and then emit the red light or green light (when the phosphor 211b is a R/G phosphor), or the phosphor 211b may change the absorbed blue light to yellow light, and then emit the yellow light (when the phosphor 211b is a yellow phosphor).

If the light source 211 includes an R/G phosphor, the light source 211 may emit blue light (BL) having a wavelength of about 450 nm, green light (GL) having a wavelength of about 535 nm, and red light (RL) having a wavelength of about 620 nm, as shown in the right part of FIG. 8. In other words, the light source 211 including the R/G phosphor may emit white light which blue light (BL), green light (GL), and red light (RL) are mixed to form.

However, the light source 211 including the R/G phosphor does not emit only blue light (BL), green light (GL), and red light (RL). As shown in the right part of FIG. 8, the light source 211 may emit yellow light (YL) or orange light (OL), in addition to blue light (BL), green light (GL), and red light (RL).

Also, if the light source 211 includes a yellow phosphor, the light source 211 may emit blue light and yellow light. In other words, the light source 211 including a yellow phosphor may emit white light which blue light and yellow light are mixed to form.

Figure 9:
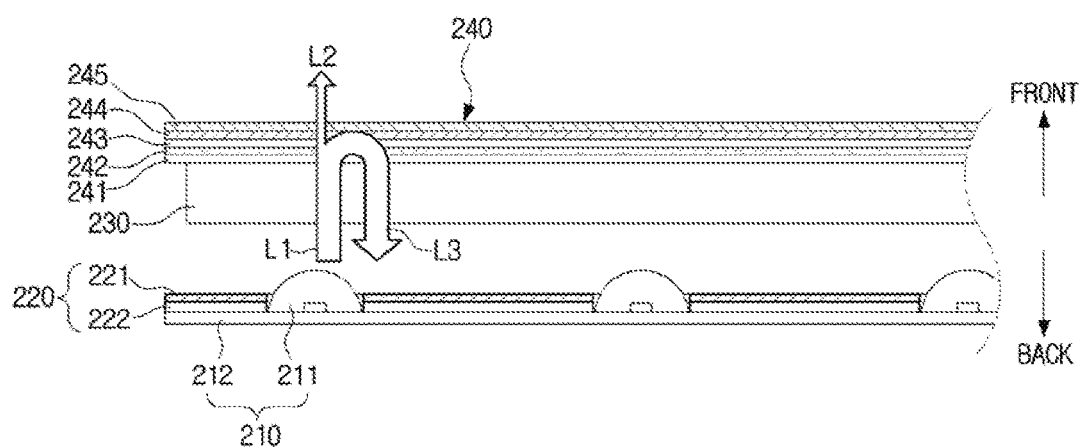
FIG. 9 shows an example of traveling of light in a backlight unit according to an embodiment of the present disclosure.
Figure 10:
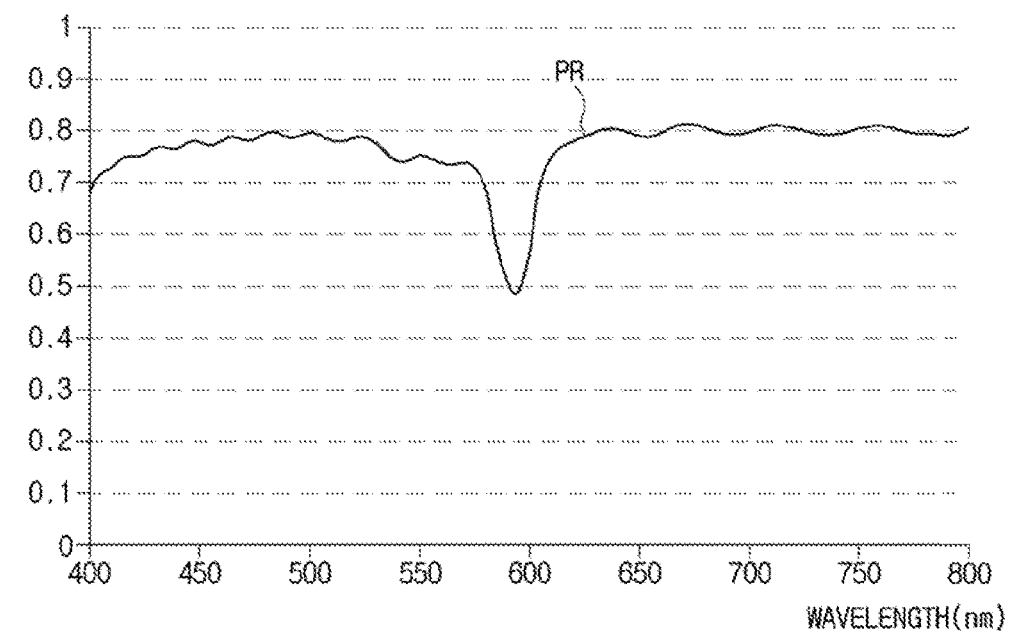
FIG. 10 is a graph showing an example of a light transmission ratio of a selective light absorption sheet included in a backlight unit according to an embodiment of the present disclosure.

FIG. 9 is a view for describing selective absorption of light by the selective light absorption sheet 244 included in the backlight unit 200 according to an embodiment of the present disclosure, and FIG. 10 is a graph showing an example of a light transmission ratio of the selective light absorption sheet 244 included in the backlight unit 200 according to an embodiment of the present disclosure.

As shown in FIG. 9, light L1 may be emitted from the light source 211 toward the front part of the backlight unit 200.

The light L1 emitted from the light source 211 may pass through the diffuser plate 230. While the light L1 passes through the diffuser plate 230, the light L1 may be uniformly diffused in the diffuser plate 230.

Then, the light L1 may pass through the diffuser sheet 241, the first prism sheet 242, and the second prism sheet 243. While the light L1 passes through the diffuser sheet 241, the light L1 may be again diffused in the diffuser sheet 241, and while the light L1 passes through the first and second prism sheets 242 and 243, the light L1 may be diffused while improving brightness.

Thereafter, the light L1 may pass through the selective light absorption sheet 244. As described above, the selective light absorption sheet 244 may include tetra-aza-porphyrin to selectively absorb light having a wavelength range of 570 nm to 610 nm.

For example, the selective light absorption sheet 244 may have a light transmission ratio PR as shown in FIG. 10. As shown in FIG. 10, the selective light absorption sheet 244 may have a very low light transmission ratio PR at the wavelength range of about 570 nm to 610 nm.

More specifically, at the other wavelengths except for the wavelength range of about 570 nm to 610 nm, the selective light absorption sheet 244 has a light transmission ratio PR of about 80%. However, at the wavelength range of about 570 nm to 610 nm, the light transmission ratio PR of the selective light absorption sheet 244 may be sharply reduced so as to become about 50% or less at a wavelength of about 585 nm.

The reason why a light transmission ratio at the wavelength range of about 570 nm to 610 nm is lower than a light transmission ratio at the other wavelengths except for the wavelength range of about 570 nm to 610 nm is because the selective light absorption sheet 244 selectively absorbs light having the wavelength range of about 570 nm to 610 nm.

In other words, while the light L1 passes through the selective light absorption sheet 244, the selective light absorption sheet 244 may selectively absorb light having the wavelength range of about 570 nm to 610 nm among the incident light L1. Accordingly, after the light L1 passes through the selective light absorption sheet 244, the intensity of the light L1 may be reduced to about 50% or less at the wavelength range of about 570 nm to 610 nm.

However, the light transmission ratio PR shown in FIG. 10 is an example of the light transmission ratio PR of the selective light absorption sheet 244, and the light transmission ratio PR of the selective light absorption sheet 244 is not limited to the light transmission ratio PR shown in FIG. 10.

For example, the minimum value of the light transmission ratio PR of the selective light absorption sheet 244 may not appear at the wavelength of 585 nm. That is, the minimum value of the light transmission ratio PR of the selective light absorption sheet 244 may appear at an arbitrary wavelength within the wavelength range of 570 nm to 610 nm corresponding to yellow light or orange light.

Also, the minimum value of the light transmission ratio PR of the selective light absorption sheet 244 is not limited to 50%. That is, the minimum value of the light transmission ratio PR of the selective light absorption sheet 244 may be greater than or smaller than 50%.

Then, the light L2 may be incident to the reflective polarizing sheet 245. As described above, the reflective polarizing sheet 245 may transmit light polarized in the same direction as a predetermined polarization direction, and reflect light polarized in directions that are different from the predetermined polarization direction.

In other words, light polarized in the same direction as the polarization direction of the reflective polarizing sheet 245 among the light L2 incident to the reflective polarizing sheet 245 may pass through the reflective polarizing sheet 245, and light polarized in directions that are different from the polarization direction of the reflective polarizing sheet 245 among the incident light L2 may be reflected from the reflective polarizing sheet 245.

Light L2 passed through the reflective polarizing sheet 245 may be emitted from the backlight unit 200.

Meanwhile, light L3 reflected from the reflective polarizing sheet 245 may be incident to the reflector sheet 220 via the selective light absorption sheet 244, the second and first prism sheets 243 and 242, the diffuser sheet 241, and the diffuser plate 230.

Figure 11:
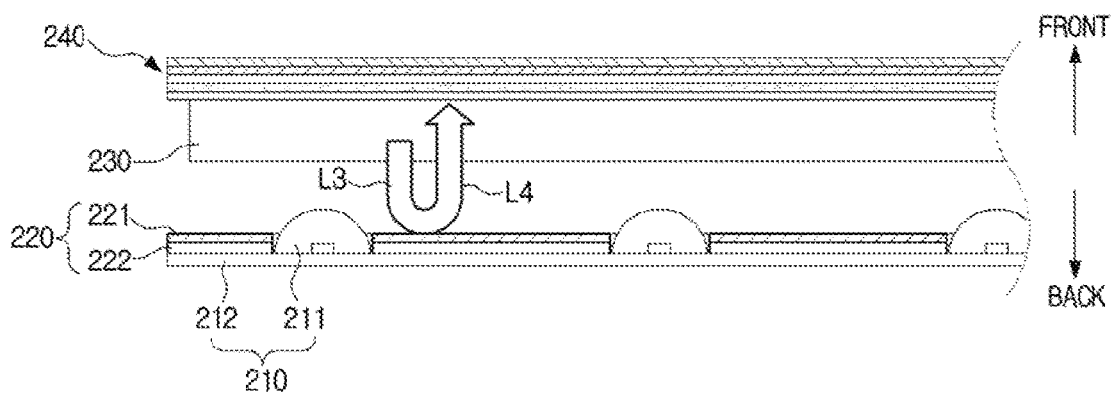
FIG. 11 shows another example of traveling of light in a backlight unit according to an embodiment of the present disclosure.
Figure 12:
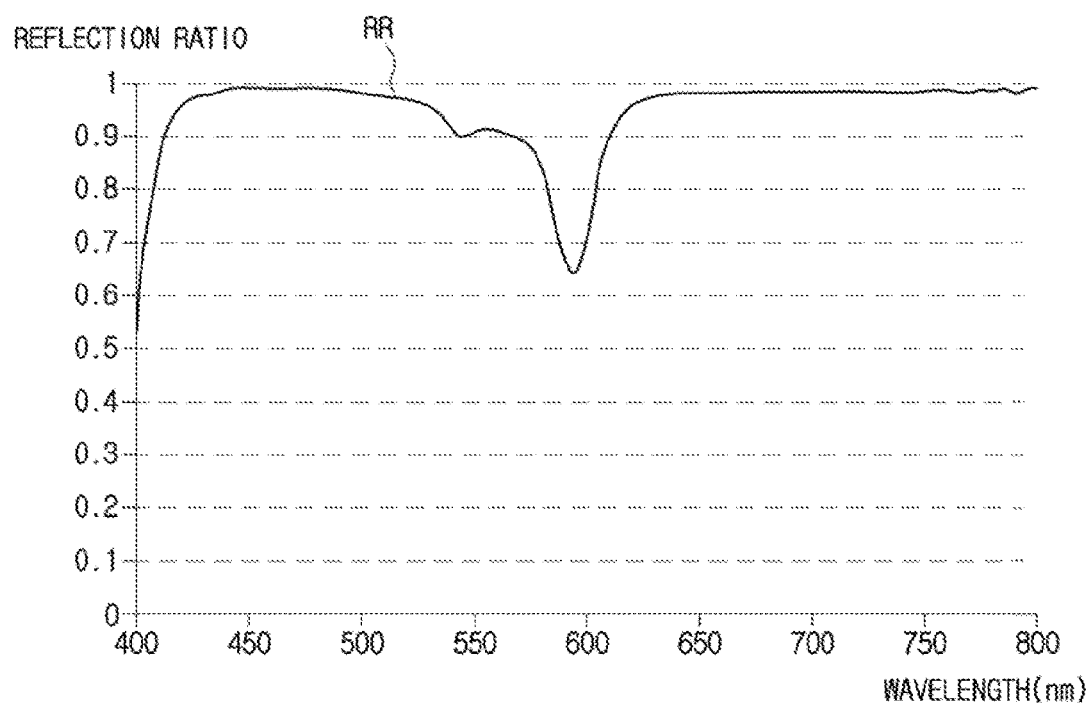
FIG. 12 is a graph showing an example of a light reflection ratio of a reflector sheet included in a backlight unit according to an embodiment of the present disclosure.

FIG. 11 shows another example of traveling of light in the backlight unit 200 according to an embodiment of the present disclosure, and FIG. 12 is a graph showing an example of a light reflection ratio of the reflector sheet 220 included in the backlight unit 200 according to an embodiment of the present disclosure.

As shown in FIG. 11, the light L3 reflected from the reflective polarizing sheet 245 may travel toward the back part of the backlight unit 200, and be incident to the reflector sheet 220.

As described above, the reflector sheet 220 may include the selective light absorption layer 221 to selectively absorb light having a wavelength range of about 570 nm to 610 nm, and the reflective film 222 to reflect incident light. Accordingly, the reflector sheet 220 may selectively absorb light having a wavelength range of about 570 nm to 610 nm, and reflect light of the other wavelengths.

For example, the reflector sheet 220 may have a light transmission ratio PR as shown in FIG. 12. As shown in FIG. 12, the reflector sheet 220 may have a very low light reflection ratio RR at a wavelength range of about 570 nm to 610 nm.

At the other wavelengths except for the wavelength range of about 570 nm to 610 nm, the reflector sheet 220 has a light reflection ratio RR of about 90% or more. Meanwhile, at the wavelength range of about 570 nm to 610 nm, the light reflection ratio RR of the reflector sheet 220 may be sharply reduced so as to become about 65% at a wavelength of about 585 nm.

The reason why the light reflection ratio at the wavelength range of about 570 nm to 610 nm is lower than the light reflection ratio at the other wavelengths except for the wavelength range of about 570 nm to 610 nm is because the selective light absorption sheet 221 of the reflector sheet 220 selectively absorbs light having the wavelength range of about 570 nm to 610 nm.

In other words, while the light L3 is reflected from the reflector sheet 220, the selective light absorption layer 221 of the reflector sheet 220 may selectively absorb light having the wavelength range of about 570 nm to 610 nm among the incident light L3, so that the intensity of light L4 reflected from the reflector sheet 220 is reduced to about 65% in the wavelength range of about 570 nm to 610 nm.

However, the light reflection ratio RR shown in FIG. 12 is an example of the light reflection ratio RR of the reflector sheet 220, and the light reflection ratio RR of the reflector sheet 220 is not limited to the light reflection ratio RR shown in FIG. 12.

For example, the minimum value of the light reflection ratio RR of the reflector sheet 220 may not appear at the wavelength of 585 nm. That is, the minimum value of the light reflection ratio RR of the reflector sheet 220 may appear at an arbitrary wavelength within the wavelength range of 570 nm to 610 nm corresponding to yellow light or orange light.

Also, the minimum value of the light reflection ratio RR of the reflector sheet 220 is not limited to 65%. That is, the minimum value of the light reflection ratio RR of the reflector sheet 220 may be greater than or smaller than 65%.

Figure 13:
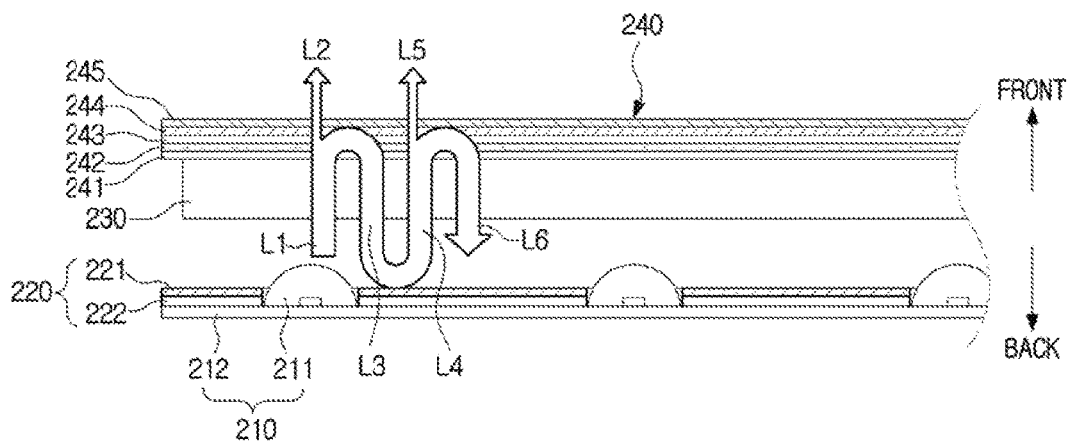
FIG. 13 shows still another example of traveling of light in a backlight unit according to an embodiment of the present disclosure.
Figure 14:
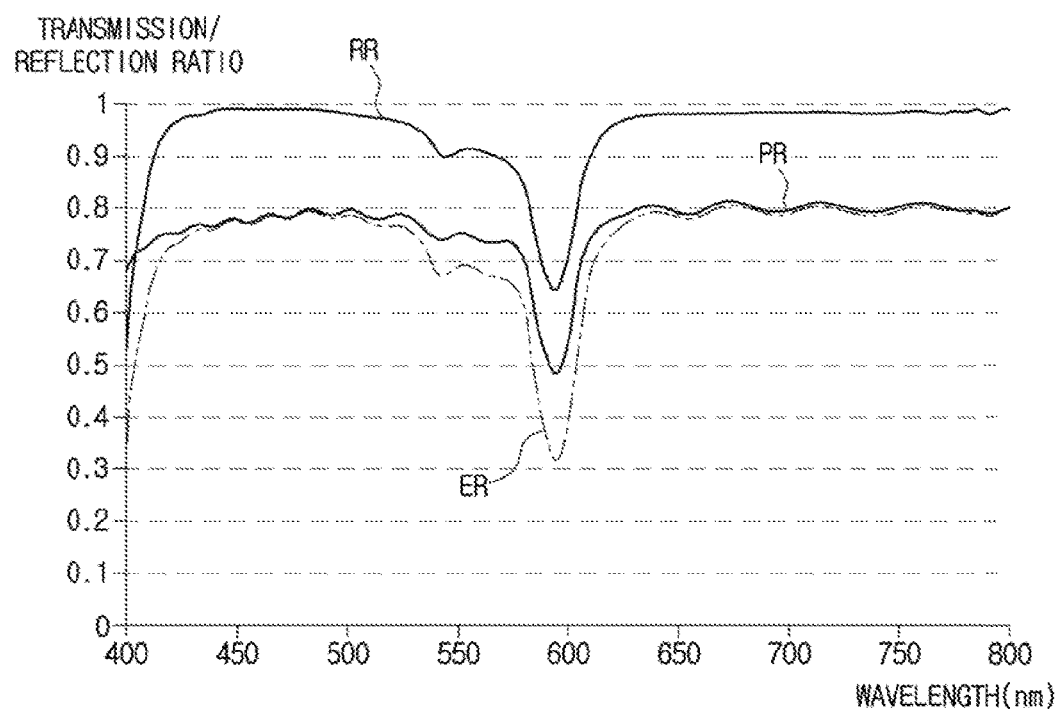
FIG. 14 is a graph showing examples of a light reflection ratio of a reflector sheet and a light transmission ratio of a selective light absorption sheet included in a backlight unit according to an embodiment of the present disclosure.

FIG. 13 shows still another example of traveling of light in the backlight unit 200 according to an embodiment of the present disclosure, and FIG. 14 is a graph showing examples of a light reflection ratio RR of the reflector sheet 220 and a light transmission ratio PR of the selective light absorption sheet 244 included in the backlight unit 200 according to an embodiment of the present disclosure.

Hereinafter, selective absorption of light by the selective light absorption sheet 244 and selective absorption of light by the reflector sheet 220 will be described with reference to FIG. 13.

Light L1 emitted from the light source 211 may be incident to the selective light absorption sheet 244 via the diffuser plate 230, the diffuser sheet 241, and the first and second prism sheets 242 and 243.

While the light L1 passes through the selective light absorption sheet 244, the selective light absorption sheet 244 may selectively absorb light having a wavelength range of about 570 nm to 610 nm.

Light L2 passed through the selective light absorption sheet 244 may be incident to the reflective polarizing sheet 245. Light polarized in the same direction as the polarization direction of the reflective polarizing sheet 245 among the light L2 incident to the reflective polarizing sheet 245 may be emitted from the backlight unit 200, and light polarized in directions that are different from the polarization direction of the reflective polarizing sheet 245 among the incident light L2 may be reflected to the inside of the backlight unit 200.

Light L3 reflected to the inside of the backlight unit 200 may be incident to the reflector sheet 220 via the selective light absorption sheet 244, the second and first prism sheets 243, and 242, the diffuser sheet 241, and the diffuser plate 230.

Then, the light L3 may be reflected from the reflector sheet 220 to proceed forward. While the light L3 is reflected from the reflector sheet 220, the reflector sheet 220 may selectively absorb light having a wavelength range of about 570 nm to 610 nm.

Light L4 reflected by the reflector sheet 220 may be incident to the reflective polarizing sheet 245 via the diffuser plate 230, the diffuser sheet 241, the first and second prism sheets 242 and 243, and the selective light absorption sheet 244. A part (that is, light L5) of the light L4 incident to the reflective polarizing sheet 245 may be emitted from the backlight unit 200, and the remaining part (that is, light L6) of the light L4 may be again reflected to the inside of the backlight unit 200.

As such, light may be recycled by repeatedly moving between the reflective polarizing sheet 245 and the reflector sheet 220.

Also, the light may be recycled by repeatedly passing through the selective light absorption sheet 244 and being reflected from the reflector sheet 220 so that light having a wavelength range of about 570 nm to 610 nm is selectively absorbed by the selective light absorption material included in the selective light absorption sheet 244 and the reflector sheet 220.

As a result, light having a wavelength range of about 570 nm to 610 nm among the light L1 emitted from the light sources 211 may be selectively absorbed, and the remaining light L2 and L5 may be emitted from the backlight unit 200. In other words, the light transmission ratio PR of the selective light absorption sheet 244 and the light reflection ratio RR of the reflector sheet 220 may be added and reflected to the light L2 and L5 emitted from the backlight unit 200.

Also, the light transmission ratio PR of the selective light absorption sheet 244 and the light reflection ratio RR of the reflector sheet 220 may be added to become a light transmission/reflection ratio ER representing a ratio of light emitted from the backlight unit 200 with respect to light emitted from the light sources 211.

For example, the light transmission ratio PR of the selective light absorption sheet 244 as shown in FIG. 10 and the light reflection ratio RR of the reflector sheet 220 as shown in FIG. 12 may be added to become a light transmission/reflection ratio ER as shown in FIG. 14. FIG. 14 shows the light transmission/reflection ratio ER of the backlight unit 200, wherein the light transmission/reflection ratio ER represents a ratio at which light emitted from the plurality of light sources 211 is not absorbed in the selective light absorption sheet 244 and the reflector sheet 220.

As shown in FIG. 14, at the other wavelengths except for the wavelength range of about 570 nm to 610 nm, the light transmission/reflection ratio ER of the backlight unit 200 is about 80%, and at the wavelength range of about 570 nm to 610 nm, the light transmission/reflection ratio ER of the backlight unit 200 may be sharply reduced so as to become about 35% at a wavelength of about 585 nm.

In other words, 70% of light having the wavelength of 585 nm among light emitted from the light sources 211 may be absorbed by the selective light absorption sheet 244 and the reflector sheet 220, and only 30% of the light may be emitted from the backlight unit 200.

However, the light transmission/reflection ratio ER shown in FIG. 14 is an example of the light transmission/reflection ratio ER of the backlight unit 200, and the light transmission/reflection ratio ER of the backlight unit 200 is not limited to the light transmission/reflection ratio ER shown in FIG. 14.

For example, the minimum value of the light transmission/reflection ratio ER of the backlight unit 200 may not appear at the wavelength of 585 nm. That is, the minimum value of the light transmission/reflection ratio ER of the backlight unit 200 may appear at an arbitrary wavelength within the wavelength range of 570 nm to 610 nm corresponding to yellow light or orange light.

Also, the minimum value of the light transmission/reflection ratio ER of the backlight unit 200 may be limited to 30%. That is, the minimum value of light transmission/reflection ratio ER of the backlight unit 200 may be greater than or smaller than 30%.

As described above, the backlight unit 200 may include the selective light absorption sheet 244 of the optical sheet 240 and the selective light absorption layer 221 of the reflector sheet 220 to selectively absorb light of a specific wavelength, thereby improving a color gamut of the display device 100 while minimizing the loss of brightness.

First, the loss of brightness by the selective light absorption sheet 244 of the optical sheet 240 and the selective light absorption layer 221 of the reflector sheet 220 will be described, below.

Figure 15:
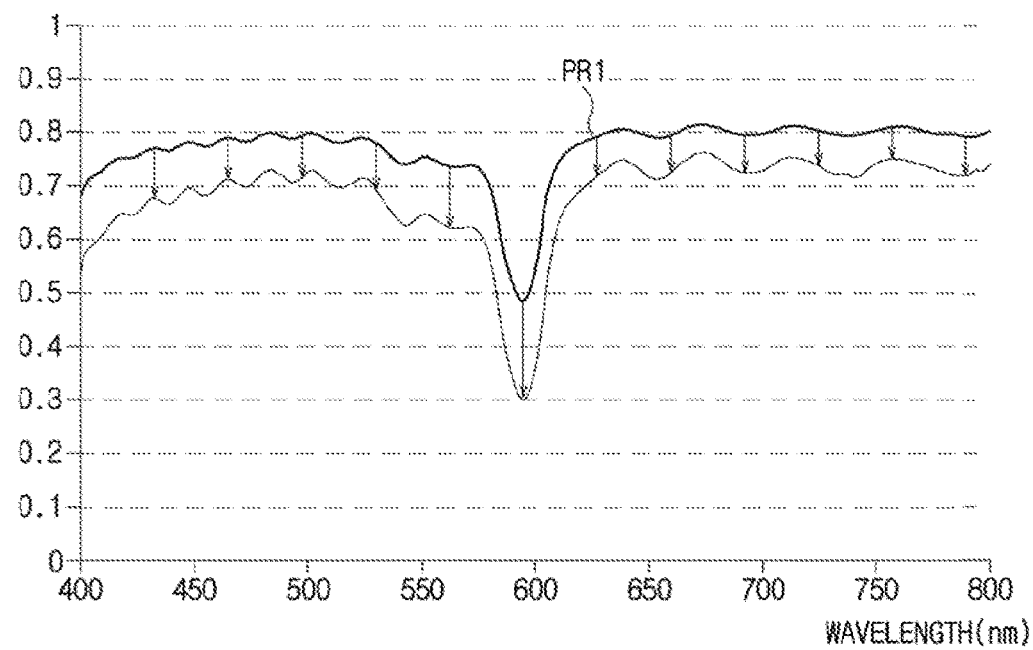
FIG. 15 is a graph showing a light transmission/reflection ratio of a backlight unit including only a selective light absorption sheet.
Figure 16:
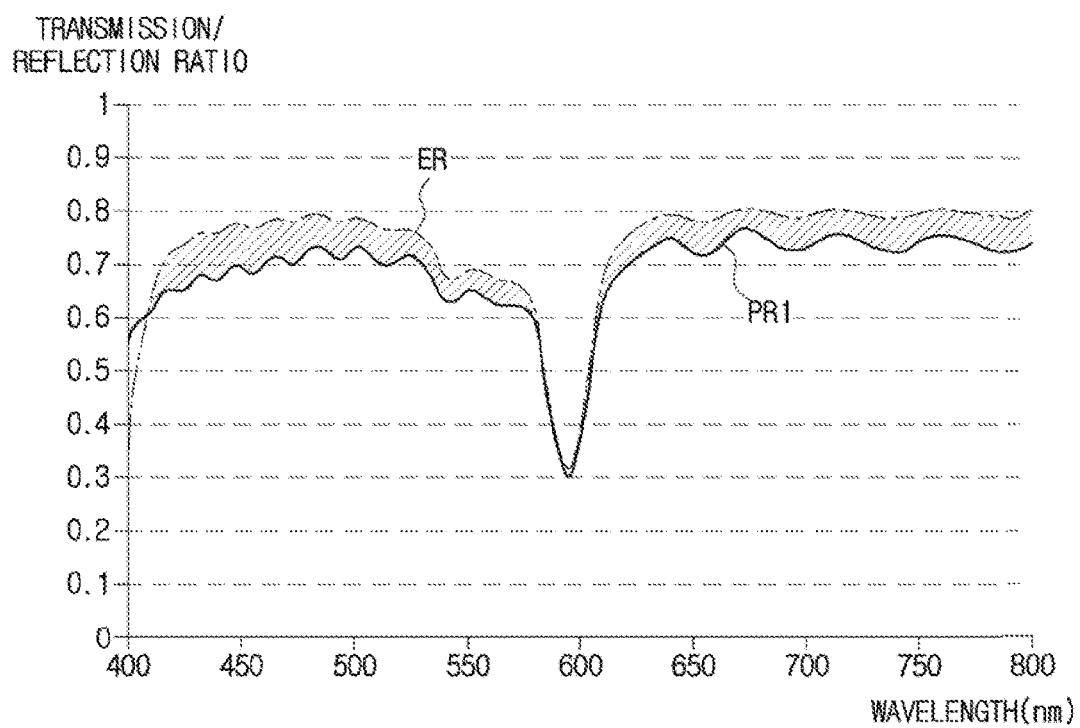
FIG. 16 is a graph showing a light transmission/reflection ratio of a backlight unit according to an embodiment of the present disclosure and a light transmission ratio of a backlight unit including only a selective light absorption sheet.

FIG. 15 is a graph showing a light transmission ratio PR1 of the backlight unit including only the selective light absorption sheet 244, and FIG. 16 is a graph showing a light transmission/reflection ratio ER of the backlight unit 200 according to an embodiment of the present disclosure and a light transmission ratio PR1 of the backlight unit including only the selective light absorption sheet 244.

When any one of the selective light absorption sheet 244 of the optical sheet 240 and the selective light absorption layer 221 of the reflector sheet 220 is used, the brightness loss of the backlight unit 200 may further increase.

Referring to FIG. 10, the selective light absorption sheet 244 may transmit only about 50% of light having a wavelength of about 585 nm, and referring to FIG. 14, the backlight unit 200 may emit only 30% of light having the wavelength of about 585 nm.

If the backlight unit includes only the selective light absorption sheet 244, a larger amount of the selective light absorption material needs to be applied on the selective light absorption sheet 244 in order to reduce a light transmission ratio PR1 with respect to light having a wavelength of about 585 nm to 30%.

As a result, the brightness of the backlight unit 200 may be reduced.

For example, if a large amount of the selective light absorption material is applied in order to reduce a light transmission ratio PR1 with respect to light having a wavelength of about 585 nm to 30%, the light transmission ratio PR1 of the selective light absorption sheet 244 may be reduced by 20% with respect to light of all wavelengths, as shown in FIG. 15. Also, the light transmission ratio PR1 of the backlight unit 200 may be reduced by 20% with respect to light of all wavelengths.

As a result, as shown in FIG. 16, at the wavelength range of about 570 nm to 610 nm, the light transmission/reflection ratio ER of the backlight unit 200 according to an embodiment of the present disclosure is similar to the light transmission ratio PR1 of the backlight unit including only the selective light absorption sheet 244

However, at the other wavelengths except for the wavelength range of about 570 nm to 610 nm, the light transmission/reflection ratio ER of the backlight unit 200 according to an embodiment of the present disclosure may be greater by about 10% than the light transmission ratio PR1 of the backlight unit including only the selective light absorption sheet 244. More specifically, at the other wavelengths except for the wavelength range of about 570 nm to 610 nm, the light transmission/reflection ratio ER of the backlight unit 200 according to an embodiment of the present disclosure may be about 80%, and the light transmission ratio PR1 of the backlight unit including only the selective light absorption sheet 244 may be about 70%.

As a result, the brightness loss of the backlight unit 200 according to an embodiment of the present disclosure may be lower by about 10% than that of the backlight unit including only the selective light absorption sheet 244.

Then, color gamut widening of the display device 100 by the selective light absorption sheet 244 and the selective light absorption layer 221 of the reflector sheet 220 will be described, below.

Figure 17:
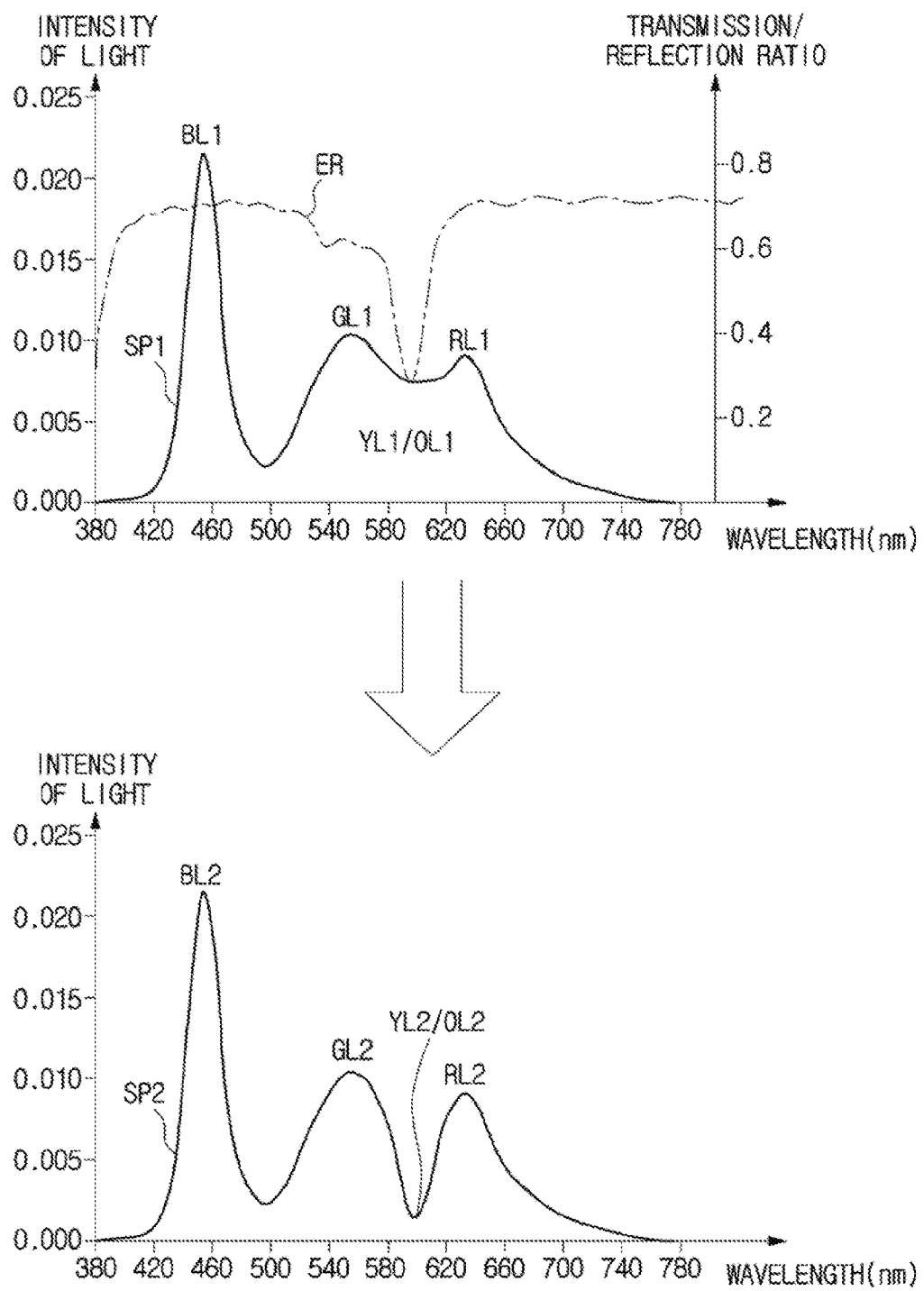
FIG. 17 shows examples of a spectrum of light emitted from a light source included in a backlight unit according to an embodiment of the present disclosure, and a spectrum of light emitted from the backlight unit.
Figure 18:
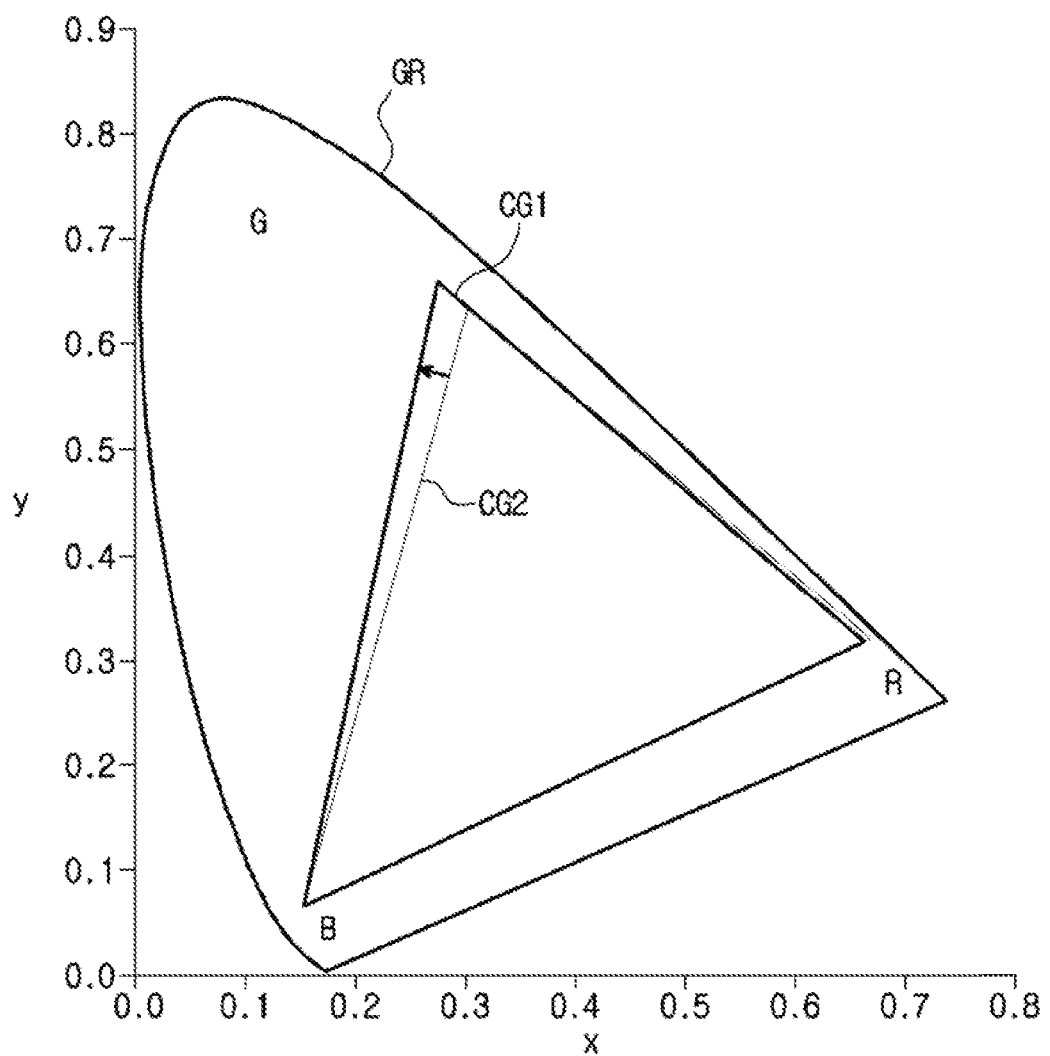
FIG. 18 is a graph showing an example of a color gamut of a display device according to an embodiment of the present disclosure.

FIG. 17 shows examples of a spectrum of light emitted from the light source 211 included in the backlight unit 200 according to an embodiment of the present disclosure, and a spectrum of light emitted from the backlight unit 200, and FIG. 18 shows an example of a color gamut of the display device 100 according to an embodiment of the present disclosure.

While light is recycled in the backlight unit 200, light having a wavelength range of about 570 nm to 610 nm among light emitted from the light source 211 may be absorbed by the selective light absorption sheet 244 of the optical sheet 240 and the selective light absorption layer 221 of the reflector sheet 220.

For example, light of a spectrum SP1 may be emitted from the light source 211, as shown in the upper part of FIG. 17. Also, a ratio of light emitted from the backlight unit 200 with reference to the light emitted from the light source 211 may become a light transmission/reflection ratio ER depending on a light transmission ratio of the selective light absorption sheet 244 of the optical sheet 240 and a light reflection ratio of the selective light absorption layer 221 of the reflector sheet 220, as shown in the upper part of FIG. 17.

More specifically, the light source 211 may emit blue light BL1 having a wavelength of about 450 nm, green light GL1 having a wavelength of about 535 nm, and red light R1L having a wavelength of about 620 nm. In other words, the light source 211 including an R/G phosphor may emit white light which blue light BL1, green light GL1, and red light RL1 are mixed to form. Also, the light source 211 may emit yellow light YL1 or orange light OL1, in addition to blue light BL1, green light GL1, and red light RL1.

Also, the light transmission/reflection ratio ER of the backlight unit 200 may be about 80% at the other wavelengths except for the wavelength range of about 570 nm to 610 nm, and may be sharply reduced at the wavelength range of about 570 nm to 610 nm so as to become about 30% at a wavelength of about 585 nm.

If the light transmission/reflection ratio ER of the backlight unit 200 is applied to the spectrum SP1 of the light source 211, a spectrum SP2 may be acquired as shown in the lower part of FIG. 17. In other words, the backlight unit 200 may emit light of the spectrum SP2 as shown in the lower part of FIG. 17.

As shown in the lower part of FIG. 17, the backlight unit 200 may emit blue light BL1 having a wavelength of about 450 nm, green light GL1 having a wavelength of about 535 nm, and red light R1L having a wavelength of about 620 nm. In other words, the backlight unit 200 may emit white light which blue light BL2, green light GL2, and red light RL2 are mixed to form.

Also, the backlight unit 200 may emit yellow light YL2 and orange light OL2, in addition to the blue light BL2, green light GL2, and red light RL2.

However, the intensity of the yellow light YL2 or orange light OL2 that is emitted from the backlight unit 200 may be significantly lower than that of the yellow light YL1 or orange light OL1 that is emitted from the light source 211.

The reason is because the selective light absorption sheet 244 of the optical sheet 240 and the selective light absorption layer 221 of the reflector sheet 220 absorb light having the wavelength range of about 570 nm to 610 nm corresponding to the yellow light YL2 or orange light OL2.

As such, if the yellow light YL1 or orange light OL1 among the light emitted from the light source 211 is absorbed, the intensity of the yellow light YL1 or orange light OL1 may become significantly lower than those of the green light GL2 and red light RL2.

Also, green light emitted from each green pixel G (see FIG. 1) of the screen 102 (see FIG. 1) may become closer to natural green light, and red light emitted from each red pixel R (see FIG. 1) of the screen 102 (see FIG. 1) may also become closer to natural red light.

As a result, the color gamut of the display device 100 can be widened, as shown in FIG. 18.

A graph GR shown in FIG. 18 represents the color gamut of the display device 100, wherein the upper part of the graph GR represents green color G, the lower, left part of the graph GR represents blue color B, and the lower, right part of the graph GR represents red color R.

The color gamut that can be represented by the display device 100 can be expressed in the shape of a triangle in the graph GR.

As shown in FIG. 18, a color gamut (hereinafter, referred to as a first color gamut GG1) of the display device 100 including both the selective light absorption sheet 244 of the optical sheet 240 and the selective light absorption layer 221 of the reflector sheet 220 is wider than a color gamut (hereinafter, referred to as a second color gamut CG2) of a typical display device including neither the selective light absorption sheet 244 of the optical sheet 240 nor the selective light absorption layer 221 of the reflector sheet 220.

Specifically, the first color gamut CG1 of the display device 100 may have a wider area in which green color is represented than the second color gamut CG2 of the typical display device. The reason is because the selective light absorption sheet 244 of the optical sheet 240 and the selective light absorption layer 221 of the reflector sheet 220 selectively absorb yellow light or orange light.

As described above, the backlight unit 200 may include the optical sheet 240 and the reflector sheet 220 to selectively absorb yellow light or orange light, thereby widening the color gamut of the display device 100.

The above description relates to a direct-type backlight unit having light sources at the back part.

Hereinafter, an edge-type backlight unit having light sources at the lateral sides will be described.

Figure 19:
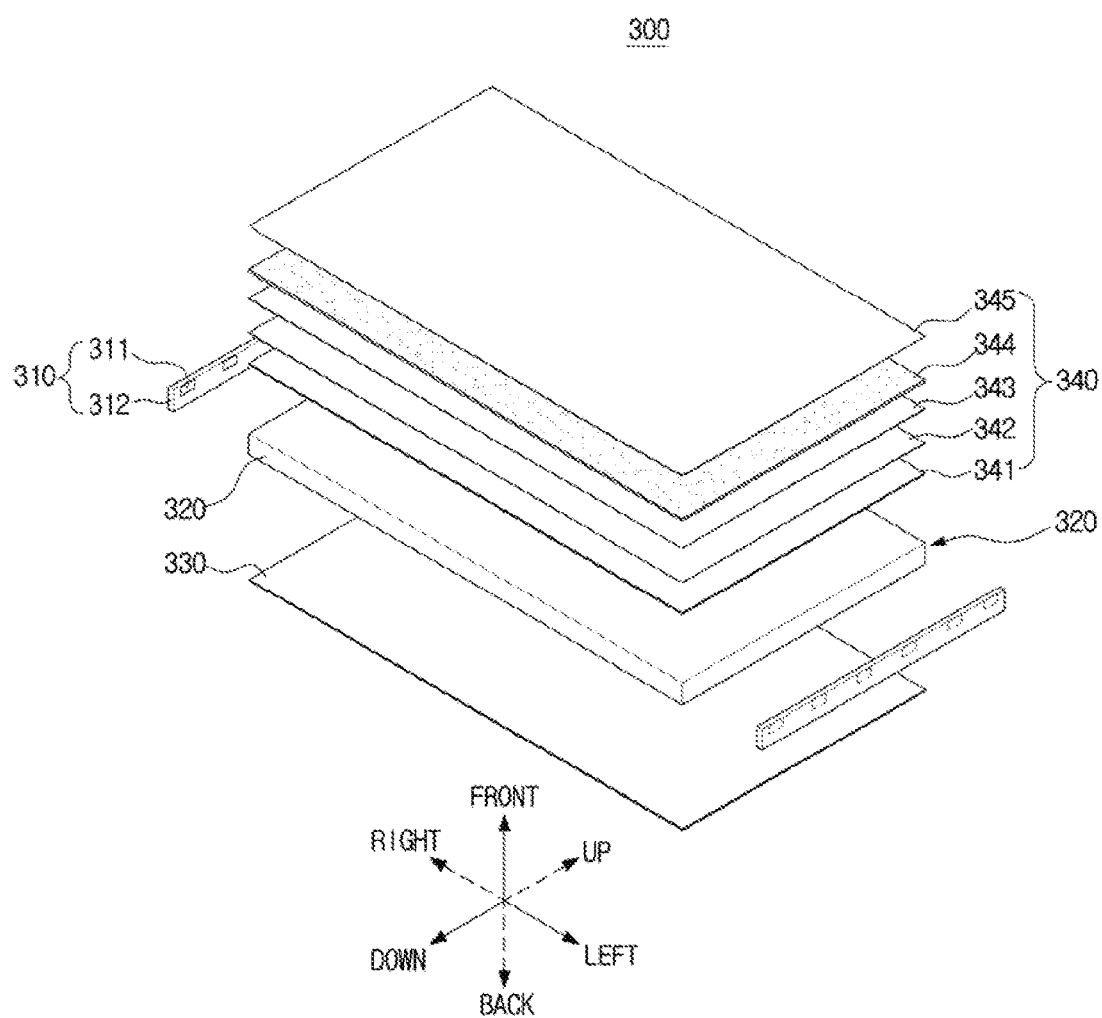
FIG. 19 is an exploded perspective view of a backlight unit according to another embodiment of the present disclosure.
Figure 20A:
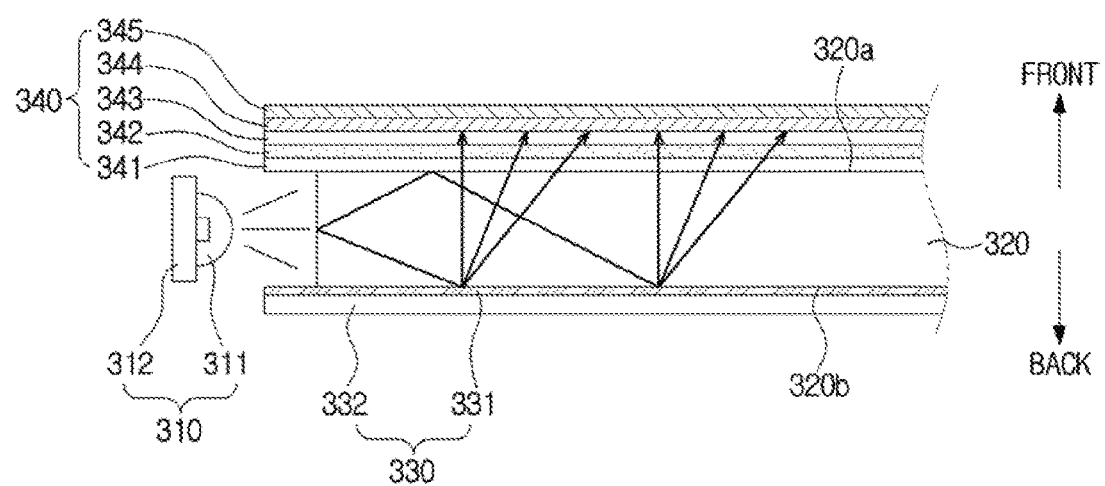
FIGS. 20A and 20B are cross-sectional views of a backlight unit according to another embodiment of the present disclosure.
Figure 20B:
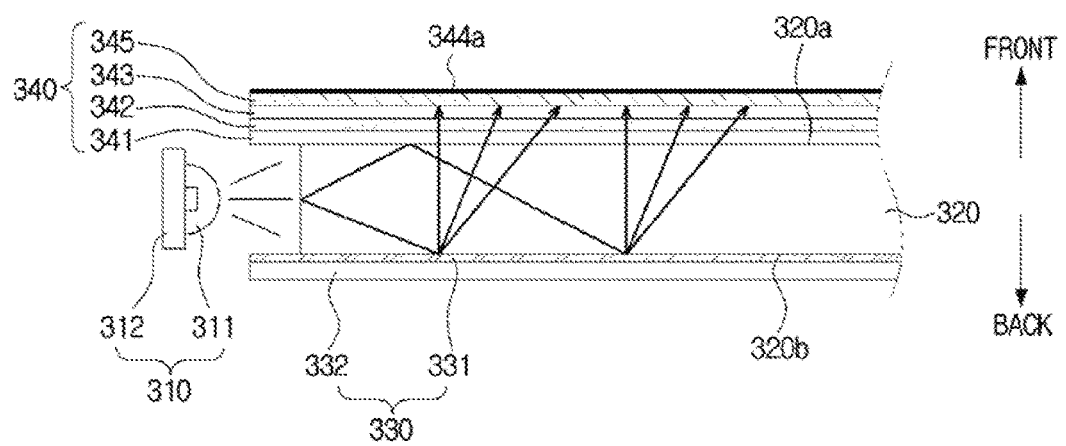

FIG. 19 is an exploded perspective view of a backlight unit according to another embodiment of the present disclosure, and FIGS. 20A and 20B are cross-sectional views of a backlight unit according to another embodiment of the present disclosure.

As shown in FIGS. 19, 20A and 20B, an edge-type backlight unit 300 may include a light-emitting module 310 to generate light, a waveguide plate 320 to diffuse light, a reflector sheet 330 to reflect light, and an optical sheet 340 to improve the brightness of light.

The light-emitting module 310 may include a plurality of light sources 311 to emit light, and a supporter 312 to support and fix the plurality of light sources 311.

The plurality of light sources 311 may be arranged at regular intervals in the lateral sides of the backlight unit 300, and may emit light toward the center of the backlight unit 300.

The plurality of light sources 311 may be equally arranged so that light emitted by the plurality of light sources 311 has uniform brightness as possible.

For example, as shown in FIG. 19, the plurality of light sources 311 may be equally arranged in the left and right lateral sides of the backlight unit 300. However, the light sources 311 may be arranged in any one of the left and right lateral sides of the backlight unit 300.

The light sources 311 may be implemented as devices that can emit monochromatic light (light of a specific wavelength, for example, blue light) or white light (light obtained by mixing light of various wavelengths) in all directions when power is supplied.

For example, the light sources 311 may be implemented as LEDs or CCFLs having low heat generation.

In the case in which the light sources 311 emits white light, each light source 311 may include a blue light-emitting diode to emit blue light which is high energy light, and a R/G phosphor to absorb blue light to emit green light and red light. Also, each light source 311 may include a blue light-emitting diode to emit blue light which is high energy light, and a YAG phosphor to absorb blue light to emit yellow light. Also, the light source 311 may include a blue light-emitting diode and a K2SiF6 (KSF) or K2TiF6 (KTF) phosphor developed recently.

The supporter 312 may fix the plurality of light sources 311 so that the positions of the light sources 311 do not change. Also, the supporter 312 may supply power to the individual light sources 311 so that the light sources 311 can emit light.

The supporter 312 may be disposed, together with the light sources 311, at the lateral sides of the backlight unit 300. For example, as shown in FIG. 19, two supporters 312 may be disposed at the left and right lateral sides of the backlight unit 300. However, one supporter 312 may be disposed at any one of the left and right lateral sides of the backlight unit 300.

The supporter 312 may be fabricated with a synthetic resin which fixes the plurality of light sources 311 and on which conductive power supply lines for supplying power to the light sources 311 are formed. Alternatively, the supporter 312 may be fabricated with a PCB.

The waveguide plate 320 may change the traveling direction of light incident to the lateral surfaces from the light sources 311 so as to emit the light forward. Also, the waveguide plate 320 may diffuse light incident from the light sources 311, and then emit the diffused light through the front surface 320*a*.

In order to diffuse light to change the traveling direction of light, a plurality of convex stripes may be formed on the front surface 320*a* of the waveguide plate 320, and a plurality of dots may be formed on the rear surface 320*b* of the waveguide plate 320. Also, the size and interval of the convex stripes and dots may be adjusted so that uniform light can exit the front surface 320*a* of the waveguide plate 320. Also, the convex stripes formed on the front surface 320*a* of the waveguide plate 320 may be embossed by a printing method, and the dots formed on the rear surface 320*b* of the waveguide plate 320 may be engraved using laser.

Since the light sources 311 are arranged at both lateral sides of the backlight unit 300, as described above, non-uniform brightness distribution may appear due to the positions of the light sources 311.

The waveguide plate 320 may diffuse light emitted from the light sources 311 in order to remove non-uniform brightness distribution due to the light sources 311. Particularly, the waveguide plate 320 may have a milky-white color so that the uniformity of brightness is not lost when light emitted from the light sources 311 directly passes through the waveguide plate 320, wherein a light transmission ratio of the waveguide plate 320 may be about 50 to 70%.

The light incident to the inside of the waveguide plate 320 may travel in various directions according to the incident angle. For example, light incident toward the front of the waveguide plate 320 may be reflected from the front surface 320*a* of the waveguide plate 320 and then proceed toward the rear surface 320*b* of the waveguide plate 320, or may be refracted from the front surface 320*a* of the waveguide plate 320 and then incident to the optical sheet 340. Also, light incident toward the back of the waveguide plate 320 may be reflected from the rear surface 320*b* of the waveguide plate 320 or scattered by the dots formed on the rear surface 320*b* of the waveguide plate 320 and then proceed toward the front surface 320*a* of the waveguide plate 320.

Due to light reflection generated in the front and rear surfaces 320*a* and 320*b* of the waveguide plate 320, light incident to the lateral surfaces of the waveguide plate 320 may proceed to the center area of the waveguide plate 320. Also, due to light scattering generated in the rear surface 320*b* of the waveguide plate 320 and light refraction generated in the front surface 320*a* of the waveguide plate 320, light incident to the inside of the waveguide plate 320 may be emitted from the front surface 320*a* of the waveguide plate 320.

The waveguide plate 320 may be fabricated with PMMA or PC.

The reflector sheet 330 may be provided below the waveguide plate 320, and may include a selective light absorption layer 331 to absorb light of a specific wavelength range among incident light, and a reflective film 332 to reflect light traveling backward to send the light in a forward or near-forward direction.

The reflective film 332 may reflect light exiting the rear surface 320*b* of the waveguide plate 320 toward the waveguide plate 320.

The reflective film 332 may be formed by coating a base material with a material having high reflectivity. For example, the reflective film 332 may be formed by coating a base material such as PET with polymer having high reflectivity.

The selective light absorption layer 331 may be formed by applying a selective light absorption material capable of selectively absorbing light of a specific wavelength range on the reflective film 332. Also, the selective light absorption layer may be formed by applying a sheet containing a selective light absorption material on the reflective film 332.

The selective light absorption material is a material capable of selectively absorbing light of a specific wavelength range. An example of the selective light absorption material is tetra-aza-porphyrin (TAP) widely known as Porphyrazine. The tetra-aza-porphyrin can selectively absorb light having a wavelength range of about 570 nm to 610 nm, that is, yellow light or orange light.

The reflector sheet 330 may reflect light exiting the rear surface 320*b* of the waveguide plate 320 toward the waveguide plate 320, and absorb a part of yellow light or orange light.

The optical sheet 340 may include various sheets for improving brightness or the uniformity of brightness. More specifically, the optical sheet 340 may include a diffuser sheet 341, a first prism sheet 342, a second prism sheet 343, a selective light absorption sheet 344, and a reflective polarizing sheet 345.

The diffuser sheet 341 may diffuse light to improve the uniformity of brightness. Light emitted from the light sources 311 may be diffused by the waveguide plate 320 and then again diffused by the diffuser sheet 341 included in the optical sheet 340.

Light passed through the diffuser sheet 341 may be diffused in a direction that is orthogonal to the surface of the diffuser sheet 341, thereby sharply reducing brightness.

The first and second prism sheets 342 and 343 may focus the light diffused by the diffuser sheet 341 to thereby increase brightness.

The first and second prism sheets 342 and 343 may include a plurality of prism patterns each having a trigonal prism shape, wherein the plurality of the prism patterns are arranged adjacent to each other to form a plurality of bands. A direction in which the prism patterns of the first prism sheet 342 are arranged may be orthogonal to a direction in which the prism patterns of the second prism sheet 343 are arranged.

Light passed through the first and second prism sheets 242 and 243 may have a viewing angle of about 70 degrees while having improved brightness, and travel toward the front of the backlight unit 300.

The selective light absorption sheet 344 may selectively absorb light of a specific wavelength range, like the selective light absorption layer 331 of the reflector sheet 330. However, the reflector sheet 330 may selectively absorb light of a specific wavelength range while reflecting light of the other wavelengths, whereas the selective light absorption sheet 344 may selectively absorb light of the specific wavelength range while transmitting light of the other wavelengths.

The selective light absorption sheet 344 may be formed by coating a base material with a selective light absorption material. For example, the selective light absorption sheet 344 may be formed by coating a base material such as PET with tetra-aza-porphyrin.

The selective light absorption sheet 344 may selectively absorb light of a wavelength range corresponding to yellow and orange colors, and transmit light of the other wavelength ranges.

By selectively absorbing light of a wavelength range corresponding to yellow and orange colors through the selective light absorption layer 331 of the reflector sheet 330 and the selective light absorption sheet 344 of the optical sheet 340, a color gamut that can be represented by the display device 100 may be further widened.

The reflective polarizing sheet 345, which is a kind of a polarizing film, may transmit a part of incident light and reflect the remaining light in order to enhance brightness. For example, the reflective polarizing sheet 345 may transmit light polarized in the same direction as a predetermined polarization direction, and reflect light polarized in directions that are different from the predetermined polarization direction.

The polarization direction of the reflective polarizing sheet 345 may be the same as the polarization direction of the first polarizing film 111 included in the image forming unit 110 described above. As a result, light transmitted through the reflective polarizing sheet 345 may also be transmitted through the first polarizing film 111 included in the image forming unit 110.

Also, light reflected from the reflective polarizing sheet 345 may be recycled in the inside of the backlight unit 300, and due to the recycling of light, the brightness of the display device 100 may be improved.

However, the optical sheet 340 is not limited to the sheets or films shown in FIG. 20A, and the optical sheet 340 may further include various sheets or films such as a protection sheet.

Also, the order in which the diffuser sheet 341, the first prism sheet 342, the second prism sheet 343, the selective light absorption sheet 344, and the reflective polarizing sheet 345 are stacked is not limited to that as shown in FIG. 20A.

For example, in FIG. 20A, the selective light absorption sheet 344 is disposed between the reflective polarizing sheet 345 and the prism sheets 342 and 343; however, the selective light absorption sheet 344 may be disposed on the front surface of the reflective polarizing sheet 345, between the prism sheets 342 and 343 and the diffuser sheet 341, or below the diffuser sheet 241. In other words, the position of the selective light absorption sheet 344 is not limited to that as shown in FIG. 20A.

Also, the optical sheet 340 may omit at least one part of the sheets or films shown in FIG. 20A.

For example, the optical sheet 340 may include, as shown in FIG. 20B, the diffuser sheet 341, the first prism sheet 342, the second prism sheet 343, and the reflective polarizing sheet 345.

In this case, a selective light absorption material 344$a$ may be applied on the front surface of the reflective polarizing sheet 345. For example, tetra-aza-porphyrin (TAP) may be applied on the front surface of the reflective polarizing sheet 345.

As a result, the reflective polarizing sheet 345 may reflect light selectively according to a polarization direction, and also absorb light selectively according to a wavelength.

For example, the reflective polarizing sheet 345 may transmit light polarized in the same direction as a predetermined polarization direction, and reflect light polarized in directions that are different from the predetermined polarization direction. Also, the reflective polarizing sheet 345 may selectively absorb light of a predetermined wavelength region (for example, light of 570 nm to 610 nm), and transmit light not belonging to the predetermined wavelength region.

However, the selective light absorption material 344$a$ may be not limited to be applied on the front surface of the reflective polarizing sheet 345.

For example, the selective light absorption material 344$a$ may be applied on the rear surface of the reflective polarizing sheet 345, on the front or rear surface of the second prism sheet 343, on the front or rear surface of the first prism sheet 342, or on the front or rear surface of the diffuser sheet 341.

As described above, the display device 100 may include the image forming unit 110 and the backlight unit 300. Also, the backlight unit 300 may include the selective light absorption layer 331 of the reflector sheet 330 and the selective light absorption sheet 344 of the optical sheet 300 in order to widen a color gamut that can be represented by the display device 100. Also, the backlight unit 300 may include the optical sheet 340 on which the selective light absorption material 344$a$ is applied.

Hereinafter, recycling of light and selective absorption of light that are generated in the backlight unit 300 will be described.

Figure 21:
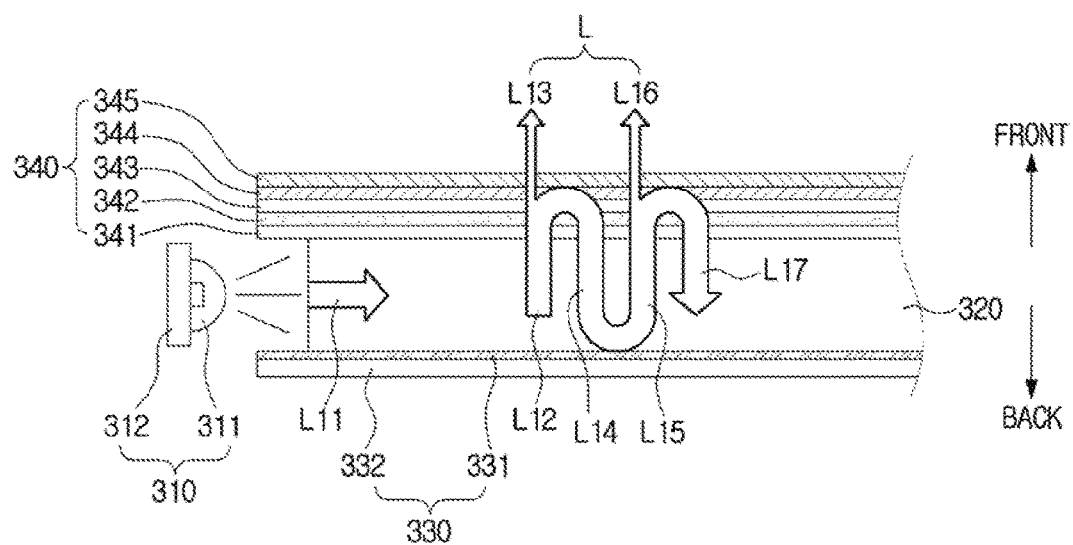
FIG. 21 shows an example of traveling of light in a backlight unit according to another embodiment of the present disclosure.

FIG. 21 shows an example of traveling of light in a backlight unit according to another embodiment of the present disclosure.

As shown in FIG. 21, light L11 emitted from the light sources 311 may be incident to the waveguide plate 320, and the waveguide plate 320 may reflect or refract the light L11 to send the light L11 forward.

Then, light L12 exiting the waveguide plate 320 may pass through the diffuser sheet 341, the first prism sheet 342, and the second prism sheet 343. While the light L12 passes through the diffuser sheet 341, the first prism sheet 342, and the second prism sheet 343, the light L12 may be diffused while improving brightness.

Then, the light L12 may pass through the selective light absorption sheet 344. As described above, the selective light absorption sheet 344 may include tetra-aza-porphyrin that selectively absorbs light having a wavelength range of about 570 nm to 610 nm. While the light L12 passes through the selective light absorption sheet 344, the selective light absorption sheet 344 may selectively absorb light having a wavelength range of about 570 nm to 610 nm among the incident light L12.

Then, light L13 may be incident to the reflective polarizing sheet 345. As described above, the reflective polarizing sheet 345 may transmit light polarized in the same direction as a predetermined polarization direction, and reflect light polarized in directions that are different from the predetermined polarization direction. Light polarized in the same direction as the polarization direction of the reflective polarizing sheet 345 among the light L13 incident to the reflective polarizing sheet 345 may pass through the reflective polarizing sheet 345, and light polarized in directions that are different from the polarization direction of the reflective polarizing sheet 245 among the incident light L13 may be reflected from the reflective polarizing sheet 345.

Light L13 passed through the reflective polarizing sheet 345 may be emitted from the backlight unit 300.

Meanwhile, light L14 reflected from the reflective polarizing sheet 345 may be incident to the reflector sheet 330 via the selective light absorption sheet 344, the second and first prism sheets 343 and 342, the diffuser sheet 341, and the waveguide plate 320.

The reflector sheet 330 may include the selective light absorption layer 331 to selectively absorb light having a wavelength range of about 570 nm to 610 nm, and the reflective film 332 to reflect incident light. As a result, the reflector sheet 330 may selectively absorb light having a wavelength range of about 570 nm to 610 nm, and reflect light of the other wavelengths.

Light L15 reflected from the reflector sheet 330 may be again incident to the reflective polarizing sheet 345 via the waveguide plate 320, the diffuser sheet 341, the first and second prism sheets 342 and 343, and the selective light absorption sheet 344. A part (that is, light L16) of the light L15 incident to the reflective polarizing sheet 345 may be emitted from the backlight unit 300, and the remaining light L17 may be reflected to the inside of the backlight unit 300.

In this way, light may be recycled in the backlight unit 300. While light is recycled in the backlight unit 300, light having a wavelength range of about 570 nm to 610 nm, that is, yellow or orange light may be selectively absorbed, and the remaining light may be emitted from the backlight unit 300.

As described above, the backlight unit 300 may include the reflector sheet 330 and the optical sheet 340 to selectively absorb yellow light or orange light, so that the color gamut of the display device 100 can be widened.

According to an aspect of the present disclosure, a display device of displaying a wide color image can be provided.

According to another aspect of the present disclosure, a display device of displaying a wide color image while minimizing the loss of brightness can be provided.

According to still another aspect of the present disclosure, a backlight unit capable of removing yellow light or orange light included in light emitted from light sources can be provided.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display device, comprising:
a backlight unit; and
an image forming unit configured to one of transmit and block light emitted from the backlight unit to form an image,
wherein the backlight unit comprises:
a light source;
a reflector sheet configured to absorb at least one of yellow light and orange light incident on the reflector sheet from the light source, and to reflect light not absorbed by the reflector sheet;
a light absorption sheet configured to selectively absorb at least one of yellow light and orange light among from light incident on the light absorption sheet from the light source and transmit light not absorbed by the light absorption sheet; and
a reflective polarizing sheet configured to transmit a part of the light incident on the optical sheet toward the image forming unit and reflect other part of the light incident on the optical sheet toward the reflector sheet,
wherein the reflector sheet comprises:
a light absorption layer configured to selectively absorb the at least one of yellow light and orange light among from light incident on the reflector sheet and transmit light not absorbed by the light absorption layer, and
a reflective film configured to reflect light transmitted through the light absorption layer.

2. The display device according to claim 1, wherein the light absorption layer contains tetra-aza-porphyrin to absorb light having a wavelength range of about 570 nm to about 610 nm.

3. The display device according to claim 2, wherein the reflector sheet is formed by applying the tetra-aza-porphyrin to the reflector film.

4. The display device according to claim 1, wherein the light absorption layer contains a selective light absorption material to absorb light having a wavelength maximum of about 585 nm.

5. The display device according to claim 1, wherein the light absorption sheet contains tetra-aza-porphyrin to absorb light having a wavelength range of about 570 nm to about 610 nm.

6. The display device according to claim 5, wherein the light absorption sheet is formed by applying the tetra-aza-porphyrin to a transparent film.

7. The display device according to claim 1, wherein the light source comprises:
a light-emitting diode configured to emit blue light; and
a phosphor configured to absorb at least one part of the blue light, and to emit red light and green light.

8. The display device according to claim 1, wherein the light source comprises:
a light-emitting diode configured to emit blue light; and
a phosphor configured to absorb at least one part of the blue light, and to emit yellow light.

9. The display device according to claim 1, wherein the backlight unit further comprises an optical plate configured to diffuse the light emitted from the light source.

10. The display device according to claim 9, wherein the light source is disposed behind the optical plate, and
the optical plate diffuses the light emitted from the light source in an inside of the optical plate.

11. The display device according to claim 9, wherein the light source is disposed adjacent to a lateral side of the optical plate, and
the optical plate diffuses the light emitted from the light source in an inside of the optical plate.

12. The display device according to claim 1, wherein the image forming unit comprises a liquid crystal panel configured to one of transmit and block light according to an electrical field.

13. A backlight unit, comprises:
a light source;
a reflector sheet configured to absorb at least one of yellow light and orange light incident on the reflector sheet from the light source, and to reflect light not absorbed by the reflector sheet;

a light absorption sheet configured to selectively absorb at least one of yellow light and orange light among from light incident on the light absorption sheet from the light source and transmit light not absorbed by the light absorption sheet; and a reflective polarizing sheet configured to transmit a part of the light incident on the optical sheet and reflect other part of the light incident on the optical sheet, wherein the reflector sheet comprises:
- a light absorption layer configured to selectively absorb the at least one of yellow light and orange light among from light incident on the reflector sheet and transmit light not absorbed by the light absorption layer, and
- a reflective film configured to reflect light transmitted through the light absorption layer.

14. The backlight unit according to claim 13, wherein the light absorption layer contains tetra-aza-porphyrin to absorb light having a wavelength range of about 570 nm to about 610 nm.

15. The backlight unit according to claim 14, wherein the reflector sheet is formed by applying the tetra-aza-porphyrin to the reflector film.

16. The backlight unit according to claim 13, wherein the light absorption layer contains a selective light absorption material to absorb light having a wavelength maximum of about 585 nm.

17. The backlight unit according to claim 13, wherein the light absorption sheet contains tetra-aza-porphyrin to absorb light having a wavelength range of about 570 nm to about 610 nm.

18. The backlight unit according to claim 17, wherein the light absorption sheet is formed by applying the tetra-aza-porphyrin to a transparent film.

* * * * *